(12) United States Patent
Tsuda

(10) Patent No.: US 10,988,023 B2
(45) Date of Patent: Apr. 27, 2021

(54) AUTONOMOUS DRIVING ASSISTANCE SYSTEM, AUTONOMOUS DRIVING MONITORING DEVICE, ROAD MANAGEMENT DEVICE, AND AUTONOMOUS DRIVING INFORMATION GATHERING DEVICE

(71) Applicant: Mitsubishi Electric Corporation, Chiyoda-ku (JP)

(72) Inventor: Yoshiaki Tsuda, Tokyo (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 340 days.

(21) Appl. No.: 16/217,135

(22) Filed: Dec. 12, 2018

(65) Prior Publication Data

US 2019/0111784 A1    Apr. 18, 2019

Related U.S. Application Data

(62) Division of application No. 15/518,546, filed as application No. PCT/JP2015/080654 on Oct. 30, 2015, now Pat. No. 10,279,682.

(30) Foreign Application Priority Data

Oct. 30, 2014 (JP) .................................. 2014-221207
Oct. 30, 2014 (JP) .................................. 2014-221208

(51) Int. Cl.
*G01C 22/00* (2006.01)
*B60K 35/00* (2006.01)
(Continued)

(52) U.S. Cl.
CPC ............... *B60K 35/00* (2013.01); *B60Q 1/50* (2013.01); *B60R 21/00* (2013.01); *B60W 30/00* (2013.01);
(Continued)

(58) Field of Classification Search
CPC ....... B60K 35/00; B60W 30/00; B60W 50/14; B60W 40/04; B60W 30/14; G01C 21/34;
(Continued)

(56) References Cited

U.S. PATENT DOCUMENTS 5,774,069 A * 6/1998 Tanaka ................... B60W 50/14
340/903
7,102,496 B1 * 9/2006 Ernst, Jr. ............ G08G 1/096725
180/167
(Continued)

FOREIGN PATENT DOCUMENTS

JP          9-86223 A      3/1997
JP          9-161196 A     6/1997
(Continued)

OTHER PUBLICATIONS

Extended European Search Report dated Feb. 19, 2020, in Patent Application No. 19201439.7, 7 pages.
(Continued)

*Primary Examiner* — Shardul D Patel
(74) *Attorney, Agent, or Firm* — Oblon, McClelland, Maier & Neustadt, L.L.P.

(57) ABSTRACT

An autonomous driving display system includes: an autonomous driving control device to carry out autonomous driving; an autonomous driving display device display state of which is recognizable from outside a vehicle; and an in-vehicle device to make the autonomous driving control device carry out autonomous driving of the vehicle upon receiving an autonomous driving instruction signal instructing autonomous driving, monitor start of the autonomous driving of the vehicle by the autonomous driving control device, and control a display state of the autonomous driving display device to be in a display state different from a display state before the autonomous driving is started when
(Continued)

the autonomous driving of the vehicle is started by the autonomous driving control device.

11 Claims, 15 Drawing Sheets

(51) Int. Cl.
| | |
|---|---|
| *B60W 50/14* | (2020.01) |
| *B60R 21/00* | (2006.01) |
| *B60W 40/04* | (2006.01) |
| *B60Q 1/50* | (2006.01) |
| *G08G 1/01* | (2006.01) |
| *G08G 1/015* | (2006.01) |
| *G08G 1/052* | (2006.01) |
| *G08G 1/056* | (2006.01) |
| *G08G 1/0967* | (2006.01) |
| *B60W 30/00* | (2006.01) |
| *G01C 21/34* | (2006.01) |
| *G05D 1/02* | (2020.01) |
| *G08G 1/16* | (2006.01) |
| *G01S 13/931* | (2020.01) |

(52) U.S. Cl.
CPC ............ *B60W 40/04* (2013.01); *B60W 50/14* (2013.01); *G01C 21/34* (2013.01); *G05D 1/0212* (2013.01); *G05D 1/0278* (2013.01); *G08G 1/015* (2013.01); *G08G 1/0116* (2013.01); *G08G 1/0129* (2013.01); *G08G 1/0133* (2013.01); *G08G 1/052* (2013.01); *G08G 1/056* (2013.01); *G08G 1/096725* (2013.01); *G08G 1/096741* (2013.01); *G08G 1/096775* (2013.01); *G01S 2013/9316* (2020.01); *G01S 2013/9318* (2020.01); *G01S 2013/9319* (2020.01); *G01S 2013/9325* (2013.01); *G01S 2013/93185* (2020.01); *G05D 2201/0213* (2013.01); *G08G 1/166* (2013.01)

(58) Field of Classification Search
CPC ............... G05D 1/0212; G05D 1/0278; G05D 2201/0213; G05D 1/00; B60Q 1/50; G08G 1/0116; G08G 1/0129; G08G 1/0133; G08G 1/015; G08G 1/052; G08G 1/056; G08G 1/096725; G08G 1/096741; G08G 1/096775; G08G 1/166; G08G 1/09; G08G 1/16; B60R 21/00; G01S 2013/9316; G01S 2013/9318; G01S 2013/9319; G01S 2013/93185; G01S 2013/9325; B60Y 2400/92; B60Y 2300/14
USPC ............ 701/23, 24, 25, 36, 117, 400; 345/7
See application file for complete search history.

(56) References Cited

U.S. PATENT DOCUMENTS

| | | | | |
|---|---|---|---|---|
| 9,896,101 | B2* | 2/2018 | Kato | G01C 21/3617 |
| 10,279,682 | B2* | 5/2019 | Tsuda | G08G 1/0133 |
| 2003/0088344 | A1* | 5/2003 | Oda | G05D 1/0282 |
| | | | | 701/23 |
| 2007/0285512 | A1* | 12/2007 | Kitani | H04N 7/18 |
| | | | | 348/148 |
| 2012/0173069 | A1* | 7/2012 | Tsimhoni | G01C 21/365 |
| | | | | 701/25 |
| 2013/0211656 | A1 | 8/2013 | An et al. | |
| 2014/0156133 | A1* | 6/2014 | Cullinane | B60R 22/48 |
| | | | | 701/23 |
| 2014/0232564 | A1* | 8/2014 | Garay | G08G 1/0129 |
| | | | | 340/934 |
| 2015/0142248 | A1* | 5/2015 | Han | G01C 21/3602 |
| | | | | 701/23 |
| 2017/0220039 | A1* | 8/2017 | Funakawa | B60W 50/14 |
| 2017/0372148 | A1* | 12/2017 | Chen | G08G 1/0104 |

FOREIGN PATENT DOCUMENTS

| | | | |
|---|---|---|---|
| JP | 10-307993 | A | 11/1998 |
| JP | 11-53685 | A | 2/1999 |
| JP | 11-53689 | A | 2/1999 |
| JP | 11-86197 | A | 3/1999 |
| JP | 11-157405 | A | 6/1999 |
| JP | 2000-259982 | A | 9/2000 |
| JP | 2000-306194 | A | 11/2000 |
| JP | 2001-199295 | A | 7/2001 |
| JP | 2002-236993 | A | 8/2002 |
| JP | 2002-251690 | A | 9/2002 |
| JP | 2003-141676 | A | 5/2003 |
| JP | 2005-190082 | A | 7/2005 |
| JP | 2005-250564 | A | 9/2005 |
| JP | 2005-324661 | A | 11/2005 |
| JP | 2006-335312 | A | 12/2006 |
| JP | 2007-241439 | A | 9/2007 |
| JP | 2008-290680 | A | 12/2008 |
| JP | 2010-39992 | A | 2/2010 |
| JP | 2011-118603 | A | 6/2011 |
| JP | 2011-162132 | A | 8/2011 |
| JP | 2013-84147 | A | 5/2013 |
| JP | 2014-32489 | A | 2/2014 |
| JP | 2014-108771 | A | 6/2014 |
| KR | 10-2013-0091907 | A | 8/2013 |

OTHER PUBLICATIONS

International Search Report dated Feb. 2, 2016 in PCT/JP2015/080654 filed Oct. 30, 2015.
Office Action dated Aug. 21, 2018 in Korean Patent Application No. 10-2017-7009750 with unedited computer generated English translation, 10 pages.
European Search Report dated Sep. 17, 2018 in European Application No. 15854196.1.
Extended European Search Report dated Mar. 11, 2019 in Patent Application No. 15854196.1, 12 pages.
Combined Chinese Office Action and Search Report dated Sep. 9, 2019, in Patent Application No. 201580057406.6, 35 pages (with unedited computer generated English translation and English Translation of Category of Cited Documents).
Office Action dated Jan. 10, 2019 in Korean Patent Application No. 10-2017-7009750 (with English translation).
Office Action dated Jan. 15, 2019 in Korean Patent Application No. 10-2018-7030245, 9 pages (with English translation).
Chinese Office Action dated Jun. 2, 2020 in Chinese Patent Application No. 201580057406.6 (with unedited computer generated English translation), 30 pages.
Office Action dated Jan. 6, 2021 in Chinese Application No. 201580057406.6 (w/computer-generated English translation).

* cited by examiner

AUTONOMOUS DRIVING ASSISTANCE SYSTEM, AUTONOMOUS DRIVING MONITORING DEVICE, ROAD MANAGEMENT DEVICE, AND AUTONOMOUS DRIVING INFORMATION GATHERING DEVICE

CROSS-REFERENCE TO RELATED APPLICATIONS

This application is a division of and claims the benefit of priority under 35 U.S.C. § 120 from U.S. application Ser. No. 15/518,546 filed Apr. 12, 2017, the entire contents of which are incorporated herein by reference. U.S. application Ser. No. 15/518,546 is a National Stage of PCT/JP2015/080654 filed Oct. 30, 2015, and claims the benefit of priority under 35 U.S.C. § 119 from Japanese Application Nos. 2014-221207 filed Oct. 30, 2014 and 2014-221208 filed Oct. 30, 2014.

TECHNICAL FIELD

The present invention relates to an in-vehicle device, an autonomous vehicle, an autonomous driving assistance system, an autonomous driving monitoring device, a road management device, and an autonomous driving information gathering device.

BACKGROUND ART

An autonomous driving enabled vehicle capable of carrying out autonomous driving includes a large number of sensors such as cameras, lasers, and radars mounted thereon to detect and observe the surroundings of the vehicle and determines presence or absence of obstacles such as vehicles, humans, and structures around the vehicle. The autonomous driving enabled vehicle also determines a future position obtained from the current position and the vehicle speed through map matching of the vehicle speed pulses and the moving speed of the vehicle and received GPS signals with navigation map data. The autonomous driving enabled vehicle utilizes sensor information and the position information of the vehicle to carry out autonomous driving (Patent Literatures 1 to 9, for example).

CITATION LIST

Patent Literature

Patent Literature 1: JP 2014-108771 A
Patent Literature 2: JP 2005-324661 A
Patent Literature 3: JP 2014-32489 A
Patent Literature 4: JP 2002-251690 A
Patent Literature 5: JP 2005-250564 A
Patent Literature 6: JP H9-161196 A
Patent Literature 7: JP 2002-236993 A
Patent Literature 8: JP 2011-162132 A
Patent Literature 9: JP 2008-290680 A

SUMMARY OF INVENTION

Technical Problem

In a case where an event such as an accident or congestion occurs on a road on which an autonomous driving enabled vehicle is moving, however, it is dangerous for the autonomous driving enabled vehicle to move under autonomous driving because the vehicle may be involved in the event. Furthermore, in a case where a driver of a vehicle moving under autonomous driving has become aware of an accident or congestion, if the driver suddenly cancels the autonomous driving and performs a heavy braking operation or abrupt steering operation, vehicles around the vehicle are also in danger. Furthermore, in view of accident prevention, it is desirable that the autonomous driving enabled vehicle shows vehicles therearound that the vehicle is moving under autonomous driving.

An object of the present invention is to prevent accidents caused by autonomous driving enabled vehicles.

Solution to Problem

An in-vehicle device according to the present invention is installed in an autonomous driving enabled vehicle that is a vehicle capable of carrying out autonomous driving, the in-vehicle device making a display device, display state of which is recognizable from outside the autonomous driving enabled vehicle, display either of an autonomous driving state and a non-autonomous driving state not being the autonomous driving state.

The in-vehicle device according to the present invention includes a reception unit to receive a determination signal allowing determination on which of the autonomous driving state and the non-autonomous driving state to display on the display device, a transmission unit, and a control unit to transmit a display instruction according to the determination signal received by the reception unit to the display device via the transmission unit.

Advantageous Effects of Invention

The present invention allows prevention of accidents caused by autonomous driving enabled vehicles.

DESCRIPTION OF EMBODIMENTS

Figure 1:
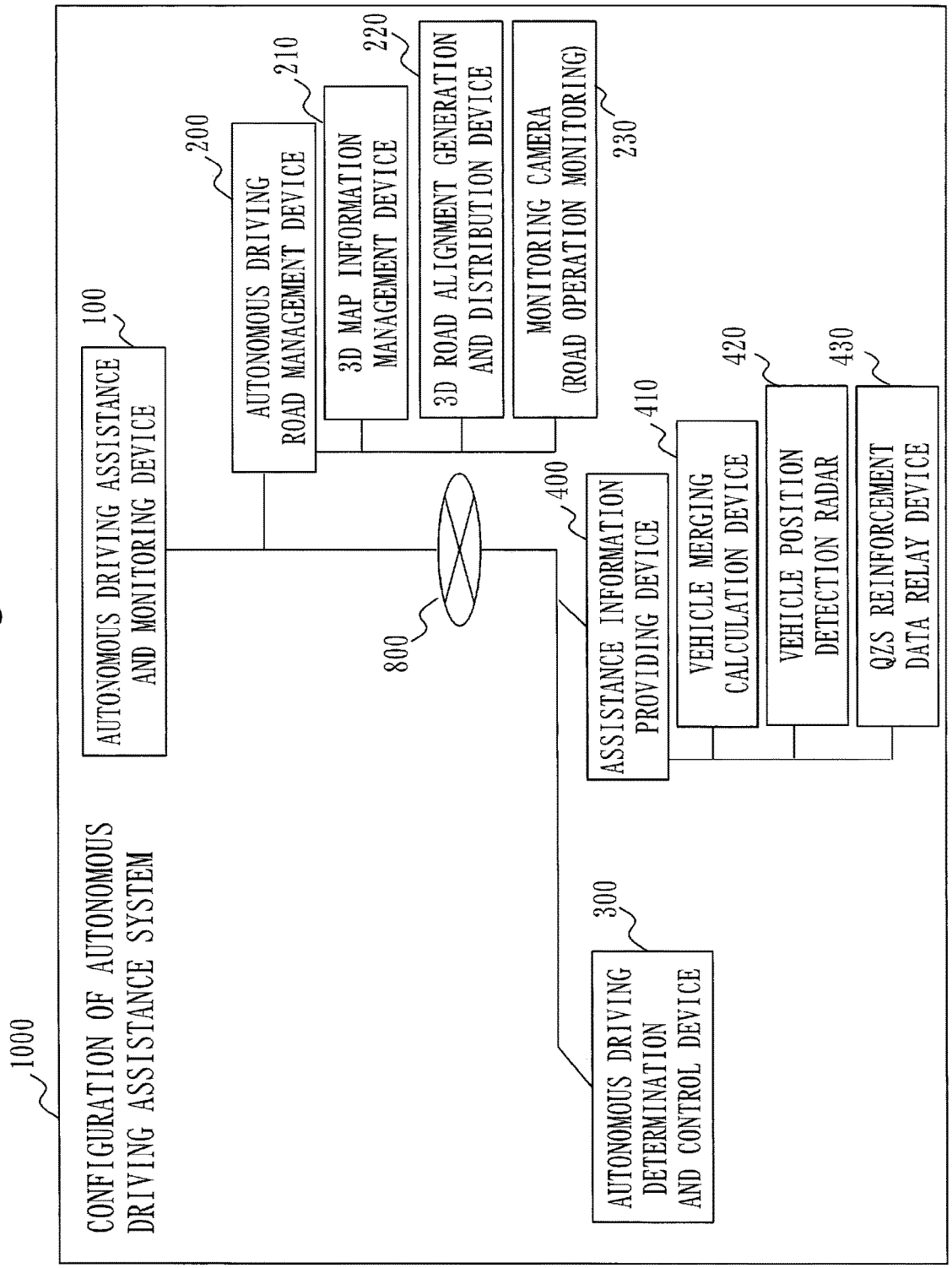
FIG. 1 is a diagram of a first embodiment, which is a configuration diagram of an autonomous driving assistance system 1000.

Terms used in embodiments below are explained in advance.

<1> A "non-autonomous vehicle 2000" refers to a vehicle that is driven by manual operation of a driver and that is unable to drive autonomously. The non-autonomous vehicle 2000 will hereinafter be referred to as a vehicle 2000.

<2> An "autonomous driving enabled vehicle 3000" refers to a vehicle that is able to drive autonomously. The autonomous driving enabled vehicle 3000 will hereinafter be referred to as a vehicle 3000.

<3> An "autonomous driving inactive vehicle 3010" refers to a vehicle 3000 that is not moving under autonomous driving but is being driven by manual operation of a driver. The autonomous driving inactive vehicle 3010 will hereinafter be referred to as an inactive vehicle 3010.

<4> "Manual driving" refers to manual driving performed by a driver, which is not autonomous driving. <5> "Autonomous driving" refers to driving a vehicle by various devices without driving operation performed by a human.

<6> An "autonomous driving active vehicle 3011" refers to a vehicle 3000 that is moving under autonomous driving. The autonomous driving active vehicle 3011 will hereinafter be referred to as an active vehicle 3011.

<7> "Broadcasting" refers to transmission to vehicles 3000. Note that broadcasting may also include transmission to vehicles 2000.

In addition, signals used in the embodiments below are explained in advance.

<1> Index signal 91A, beacon signal 91B:

An index signal 91A is transmitted by an in-vehicle device 3500 and received by an autonomous driving determination and control device 300. The index signal 91A is a signal containing the position of a vehicle 3000. In the embodiments below, the index signal 91A is a beacon signal 91B.

<2> Manual driving instruction signal 92A:

A manual driving instruction signal 92A is generated by an autonomous driving assistance and monitoring device 100, transmitted via the autonomous driving determination and control device 300, and received by the in-vehicle device 3500. The manual driving instruction signal 92A is a signal for instruction of manual driving.

<3> Autonomous driving enabling signal 92B:

An autonomous driving enabling signal 92B is generated by the autonomous driving assistance and monitoring device 100, transmitted via the autonomous driving determination and control device 300, and received by the in-vehicle device 3500. The autonomous driving enabling signal 92B is a signal to permit autonomous driving.

<4> Autonomous driving instruction signal 93:

An autonomous driving instruction signal 93 is transmitted by a plurality of types of devices, and received by the in-vehicle device 3500. The autonomous driving instruction signal 93 is a signal for instruction of autonomous driving.

<5> Switching instruction signal 94:

A switching instruction signal 94 is generated by the autonomous driving assistance and monitoring device 100, transmitted via the autonomous driving determination and control device 300, and received by the in-vehicle device 3500. The switching instruction signal 94 is a signal for instruction of forced switching to either of autonomous driving and non-autonomous driving. The switching instruction signal 94 for instruction of switching from non-autonomous driving to autonomous driving is the autonomous driving instruction signal 93.

<6> Switching control signal 95:

A switching control signal 95 is generated by the autonomous driving assistance and monitoring device 100, transmitted via the autonomous driving determination and control device 300, and received by the in-vehicle device 3500. The switching control signal 95 is the same as the switching instruction signal 94 in being a signal for instruction of switching to either of autonomous driving and non-autonomous driving. Switching control signals include two types of signals, which are (a) the autonomous driving enabling signal 92B to permit autonomous driving and (b) a signal to directly control a vehicle to carry out autonomous driving. The non-autonomous driving switching instruction signal 94 for instruction of switching from non-autonomous driving to autonomous driving corresponds to (b).

<7> Switching signal 96:

A switching signal 96 is output by a switching control unit disposed in a vehicle 3000 and received by the in-vehicle device 3500. The switching signal 96 is a signal output from the switching control unit when the switching control unit to be operated for switching from non-autonomous driving to autonomous driving is operated. The switching signal 96 is the autonomous driving instruction signal 93.

<8> Driving state signal 99:

A driving state signal 99 is output by an autonomous driving control device 3300 and received by the in-vehicle device 3500. The driving state signal 99 is a signal indicating an autonomous driving state, a non-autonomous driving state not being the autonomous driving state, a driving state of being switched from non-autonomous driving to autonomous driving, and a driving state of being switched from autonomous driving to non-autonomous driving.

<9> Determination signal 90:

A determination signal 90 is transmitted by a plurality of types of devices, and received by the in-vehicle device 3500. The determination signal 90 is a signal allowing determination on which of the autonomous driving state and the non-autonomous driving state to display on a display device. In the embodiments below, the determination signal 90 is the driving state signal 99, the switching instruction signal 94, or the like.

First Embodiment

*Description of Configuration*

FIG. 1 is a configuration diagram of an autonomous driving assistance system 1000 that assists autonomous driving. The autonomous driving assistance system 1000 will hereinafter be referred to as an assistance system 1000. The assistance system 1000 monitors all vehicles traveling on a road to be managed. The assistance system 1000 includes an autonomous driving assistance and monitoring device 100, which is a device to monitor autonomous vehicles, an autonomous driving road management device 200, which is a road management device, an autonomous driving determination and control device 300, which is an autonomous driving information gathering device, and an assistance information providing device 400 to provide assistance information. The autonomous driving assistance and monitoring device 100 and other devices are connected to a network 800, and can communicate with one another via the network 800.

Hereinafter, the autonomous driving assistance and monitoring device 100, the autonomous driving road management device 200, the autonomous driving determination and control device 300, and the assistance information providing device 400 will be referred to as a monitoring device 100, a road management device 200, an information gathering device 300, and a providing device 400, respectively.

The monitoring device 100 receives matching data from the road management device 200, and performs a determination process of determining whether or not at least an event of either congestion or an accident occurs on the managed road on the basis of the matching data. If it is determined that the event occurs as a result of the determination process, the monitoring device 100 transmits the manual driving instruction signal 92A for instruction of manual driving that is manual driving by a driver independent of autonomous driving. Hereinafter, the manual driving instruction signal 92A will be referred to as a manual signal 92A.

The monitoring device 100 is the autonomous driving monitoring device. In addition, the managed road is a road to be managed.

The road management device 200 includes a 3D map information management device 210, a 3D road alignment generation and distribution device 220, and monitoring cameras 230. The road management device 200 monitors and controls the 3D map information management device 210, the 3D road alignment generation and distribution device 220, and the monitoring cameras 230.

The 3D map information management device 210 to manage 3D map information will hereinafter be referred to as a map management device 210. The 3D road alignment generation and distribution device 220 will hereinafter be referred to as a distribution device 220.

The information gathering device 300 receives beacon signals 91B that are index signals 91A each containing the position of a vehicle 3000 transmitted from the in-vehicle device 3500 installed in the vehicle 3000, and transmits the positions contained in the received beacon signals 91B to the monitoring device 100. The monitoring device 100 determines whether or not an event such as an accident or congestion occurs on the basis of the received positions and matching data, and if it is determined that the event occurs, transmits a manual signal 92A to the information gathering device 300 to make the information gathering device 300 broadcast the manual signal 92A.

The beacon signal 91B received by the information gathering device 300 contains vehicle identification information. The information gathering device 300 also transmits the vehicle identification information to the monitoring device 100. The monitoring device 100 uses the vehicle identification information to identify autonomous driving enabled vehicles present on the managed road.

The beacon signal 91B received by the information gathering device 300 further contains driving mode information indicating whether or not the vehicles 3000 are under autonomous driving. The information gathering device 300 also transmits the driving mode information to the monitoring device 100. The monitoring device 100 uses the driving mode information to determine active vehicles 3011 that are under autonomous driving among the vehicles 3000 present on the managed road.

The monitoring device 100 determines whether or not the event including at least either of an accident and congestion has been cleared on the managed road on the basis of the matching data, and if it is determined that the event has been cleared, transmits an autonomous driving enabling signal 92B permitting autonomous driving.

In transmission of the manual signal 92A, the monitoring device 100 transmits autonomous driving prohibited zone information indicating a zone where autonomous driving is prohibited within the managed road.

The providing device 400 includes a vehicle merging calculation device 410, vehicle position detection radars 420, and a QZS reinforcement data relay device 430. The providing device 400 acquires an estimation calculation result including an estimated position of a merging vehicle merging into the managed road from a merging road merging with the managed road, and distributes the acquired estimation calculation result as assistance information.

Hereinafter, the vehicle merging calculation device 410, the vehicle position detection radars 420, and the QZS reinforcement data relay device 430 will be referred to as a calculation device 410, radars 420 and a relay device 430, respectively.

Figure 2:
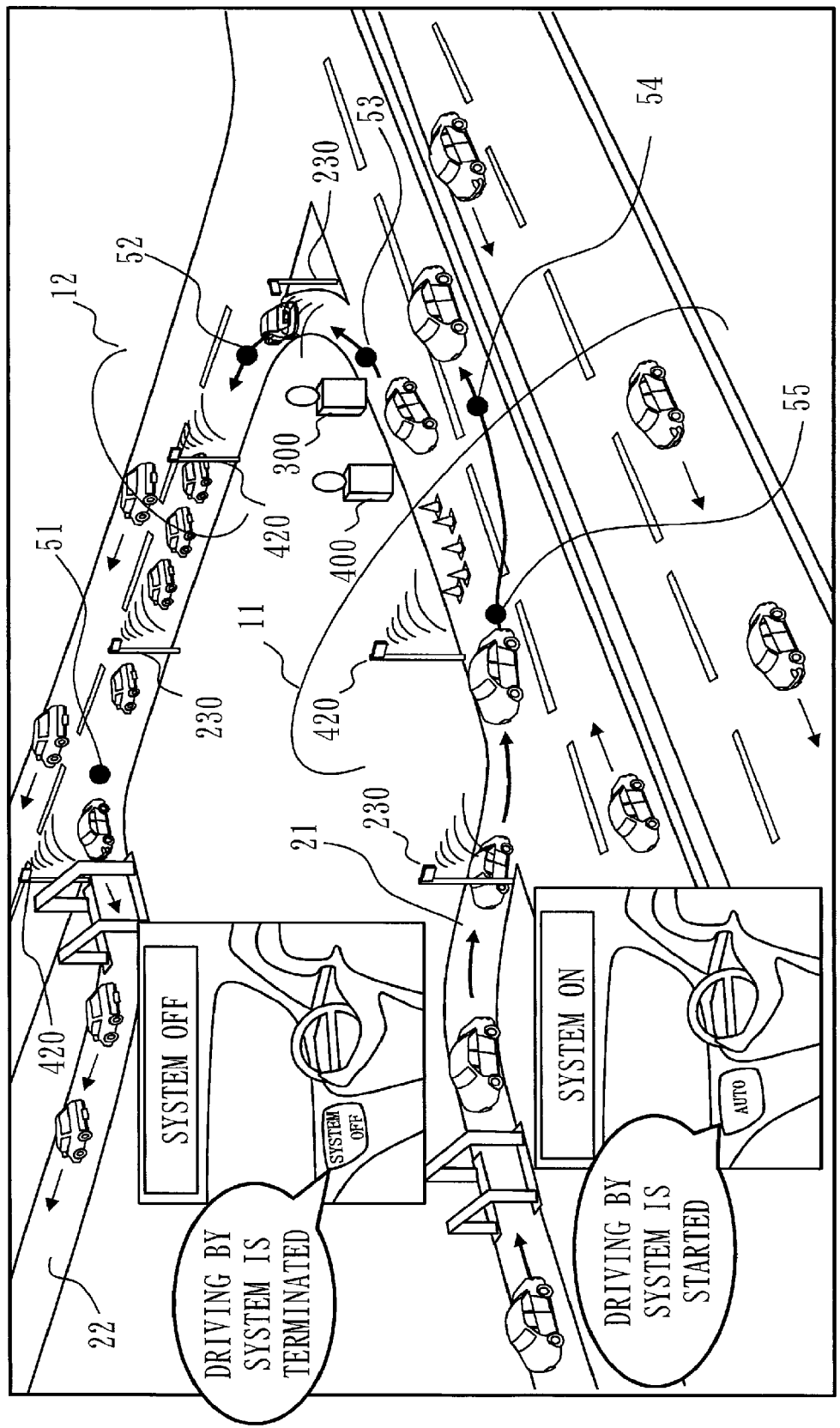
FIG. 2 is a diagram of the first embodiment, which is a diagram illustrating an outline of the autonomous driving assistance system 1000.

FIG. 2 is a diagram illustrating an outline of the assistance system 1000. FIG. 2 illustrates a main road 11, a main road 12, which are the managed roads, a merging road 21 merging into the main road 11, and an exit road 22 from the main road 12. In FIG. 2, the monitoring cameras 230 and the radars 420 are installed. FIG. 2 also illustrates a state in which the providing device 400 and the information gathering device 300 are installed. In FIG. 2, the monitoring cameras 230, the radars 420, the information gathering device 300, and the providing device 400 are arranged along the managed road, which is for detection of moving vehicles or communication with the in-vehicle devices 3500 of the vehicles 3000. In FIG. 2, a point 51 represents a diverging point to the exit road 22 diverging from the main road 12 to an interchange. A point 52 represents driving on the main road 12 of an expressway. A point 53 represents a diverging point at an interchange. A point 54 represents driving on the main road 11 on the expressway. A point 55 represents merging from the interchange into the main road 11 on the expressway via the merging road 21.

Figure 3:
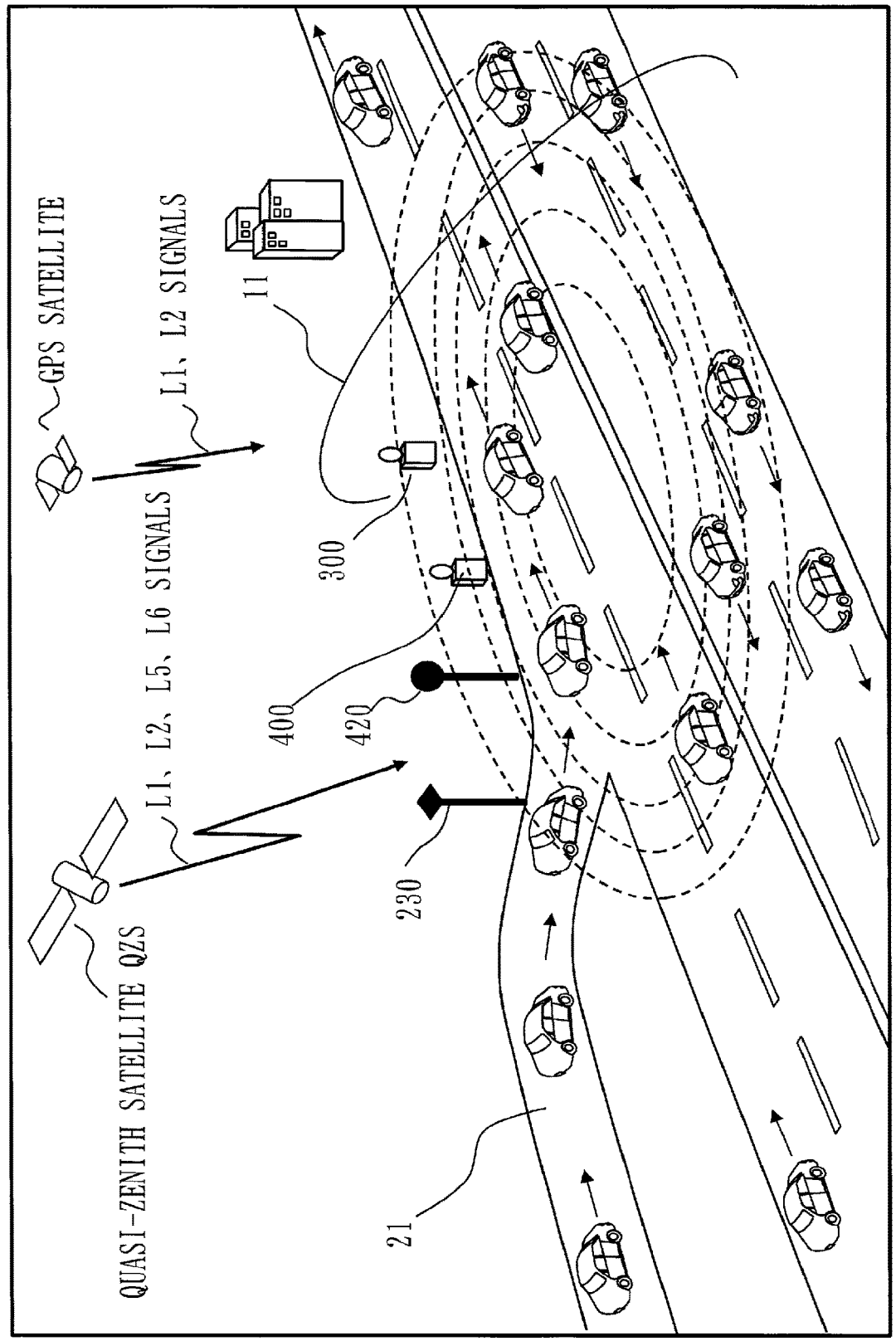
FIG. 3 is a diagram of the first embodiment, which is another diagram illustrating an outline of the autonomous driving assistance system 1000.

FIG. 3 is another diagram illustrating an outline of the assistance system 1000. As illustrated in FIG. 3, the assistance system 1000 may use information transmitted from quasi-zenith satellites QZS and GPS satellites. Information from quasi-zenith satellites QZS is correction information used for positioning. Information from GPS satellites is information for positioning.

Figure 4:
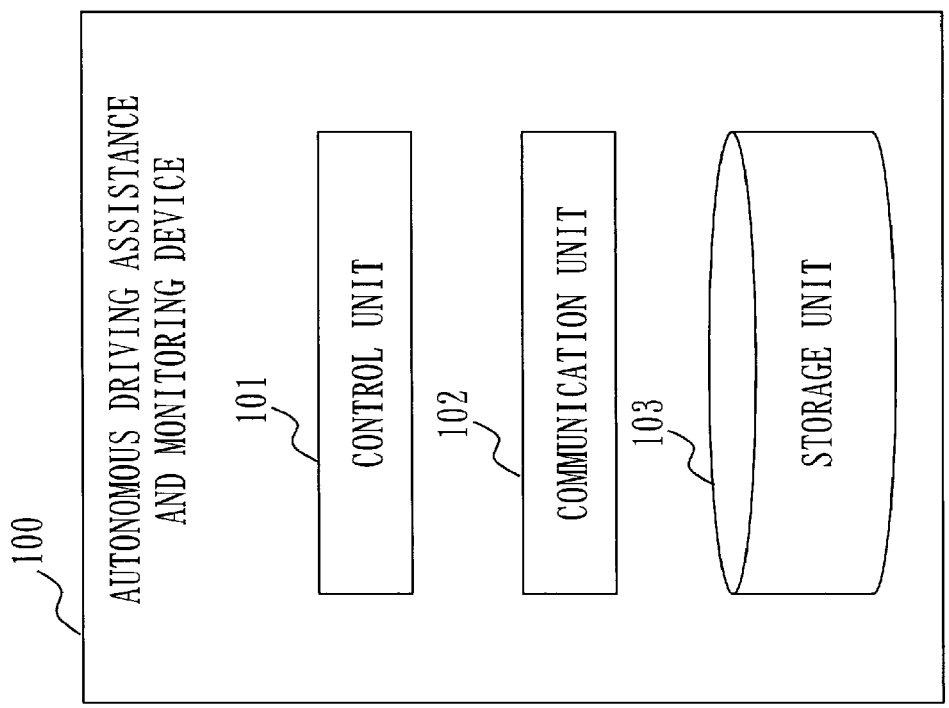
FIG. 4 is a diagram of the first embodiment, which is a block diagram of an autonomous driving assistance and monitoring device 100.

FIG. 4 is a block diagram of the monitoring device 100. The monitoring device 100 includes a control unit 101, a communication unit 102, and a storage unit 103.

Figure 5:
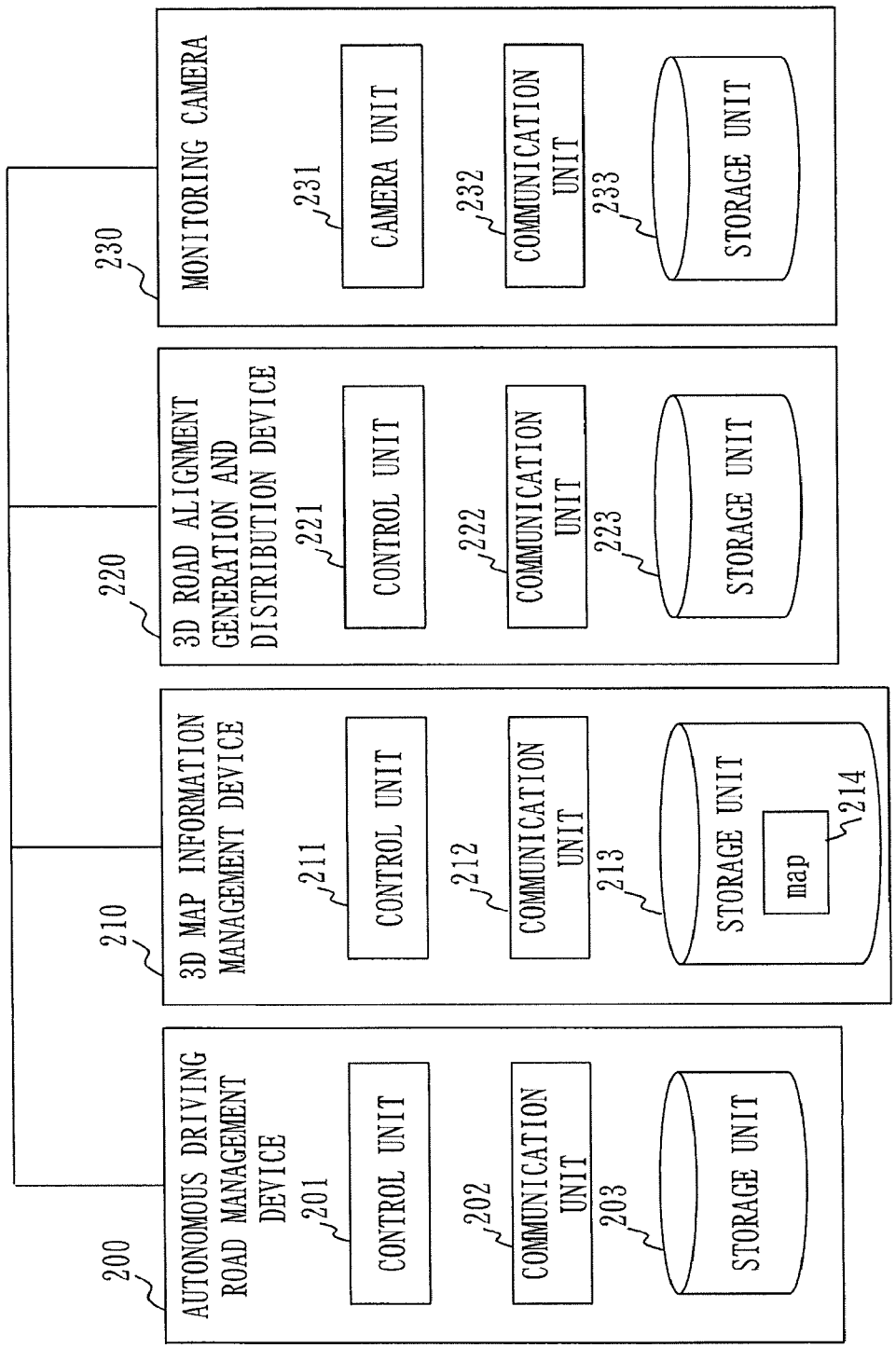
FIG. 5 is a diagram of the first embodiment, which is a block diagram of an autonomous driving road management device 200 to a monitoring camera 230.

FIG. 5 is a block diagram of the road management device 200 to the monitoring cameras 230. The road management device 200 includes a control unit 201, a communication unit 202, and a storage unit 203. The map management device 210 includes a control unit 211, a communication unit 212, and a storage unit 213. The storage unit 213 stores 3D map information 214. The distribution device 220 includes a control unit 221, a communication unit 222, and a storage unit 223. The monitoring cameras 230 each include a camera unit 231, a communication unit 232, and a storage unit 233.

Figure 6:
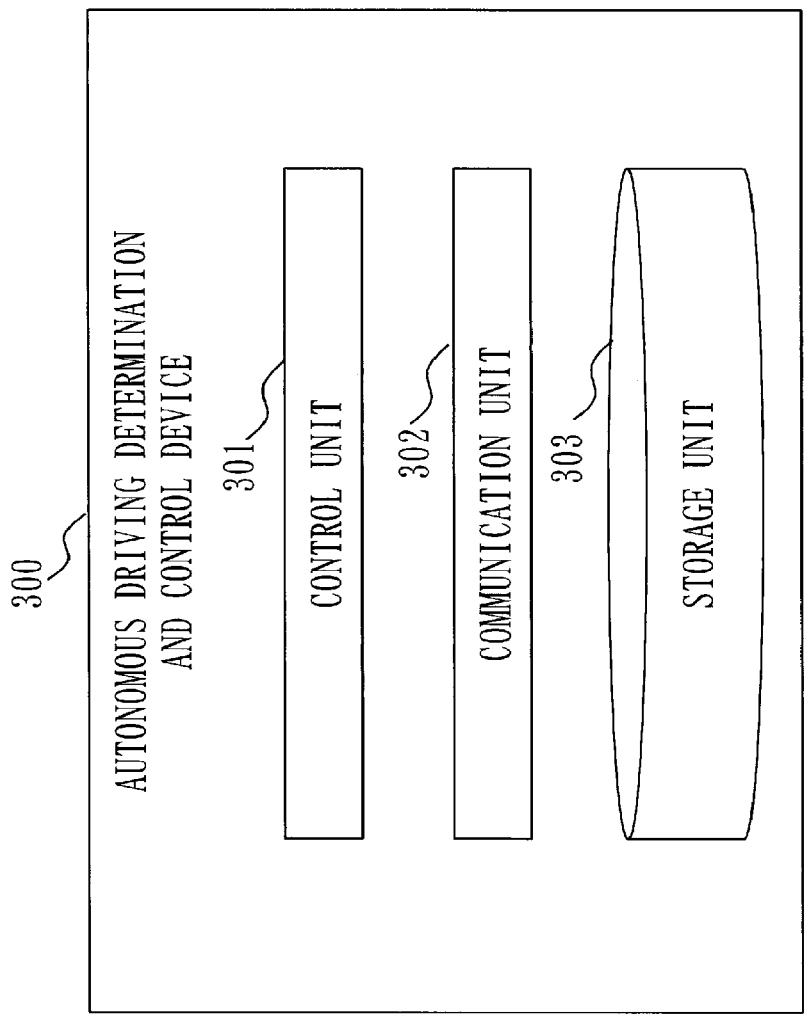
FIG. 6 is a diagram of the first embodiment, which is a block diagram of an autonomous driving determination and control device 300.

FIG. 6 is a block diagram of the information gathering device 300. The information gathering device 300 includes a control unit 301, a communication unit 302, and a storage unit 303.

Figure 7:
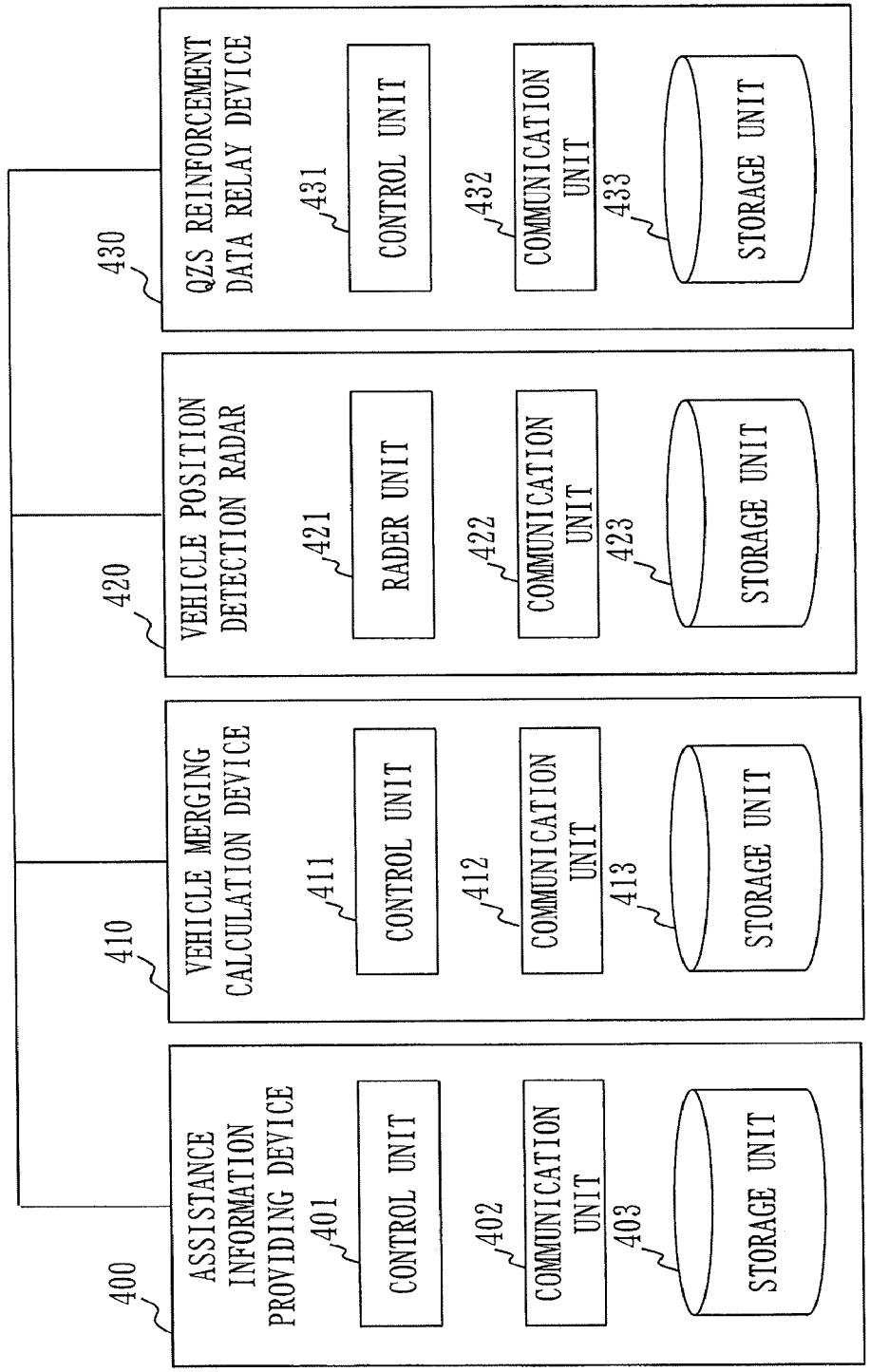
FIG. 7 is a diagram of the first embodiment, which is a block diagram of an assistance information providing device 400 to a QZS reinforcement data relay device 430.

FIG. 7 is a block diagram of the providing device 400 to the relay device 430. The providing device 400 includes a control unit 401, a communication unit 402, and a storage unit 403. The calculation device 410 includes a control unit 411, a communication unit 412, and a storage unit 413. The radars 420 each include a radar unit 421, a communication unit 422, and a storage unit 423. The relay device 430 includes a control unit 431, a communication unit 432, and a storage unit 433.

Figure 8:
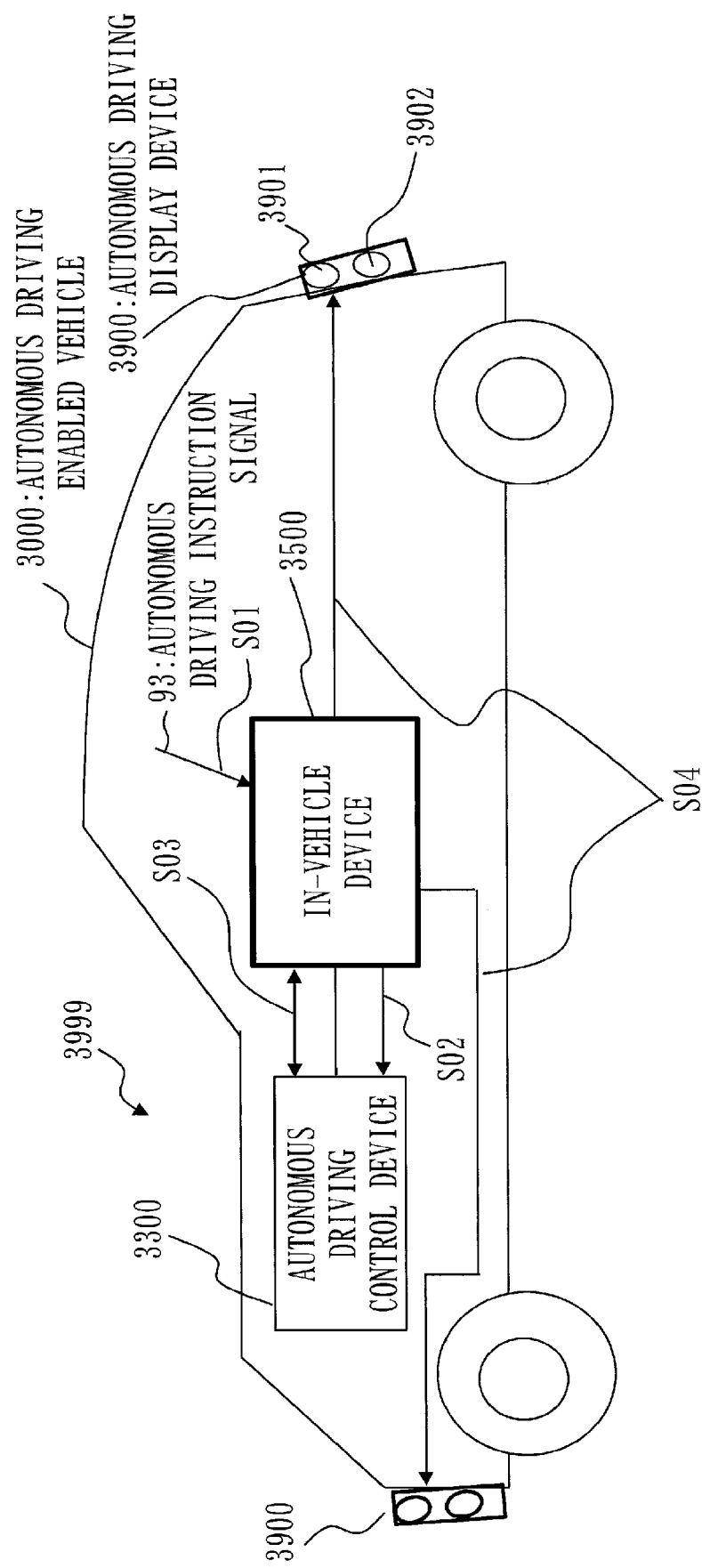
FIG. 8 is a diagram of the first embodiment, which is a diagram of devices installed in an autonomous driving enabled vehicle 3000.

FIG. 8 is a diagram illustrating devices installed in a vehicle 3000. The vehicle 3000 includes an autonomous driving control device 3300, an in-vehicle device 3500, and an autonomous driving display device 3900. The autonomous driving control device 3300 is a device to carry out autonomous driving in an autonomous driving active mode. The in-vehicle device 3500 transmits and receives data to/from other devices. The autonomous driving display device 3900 will be described later.

Figure 9:
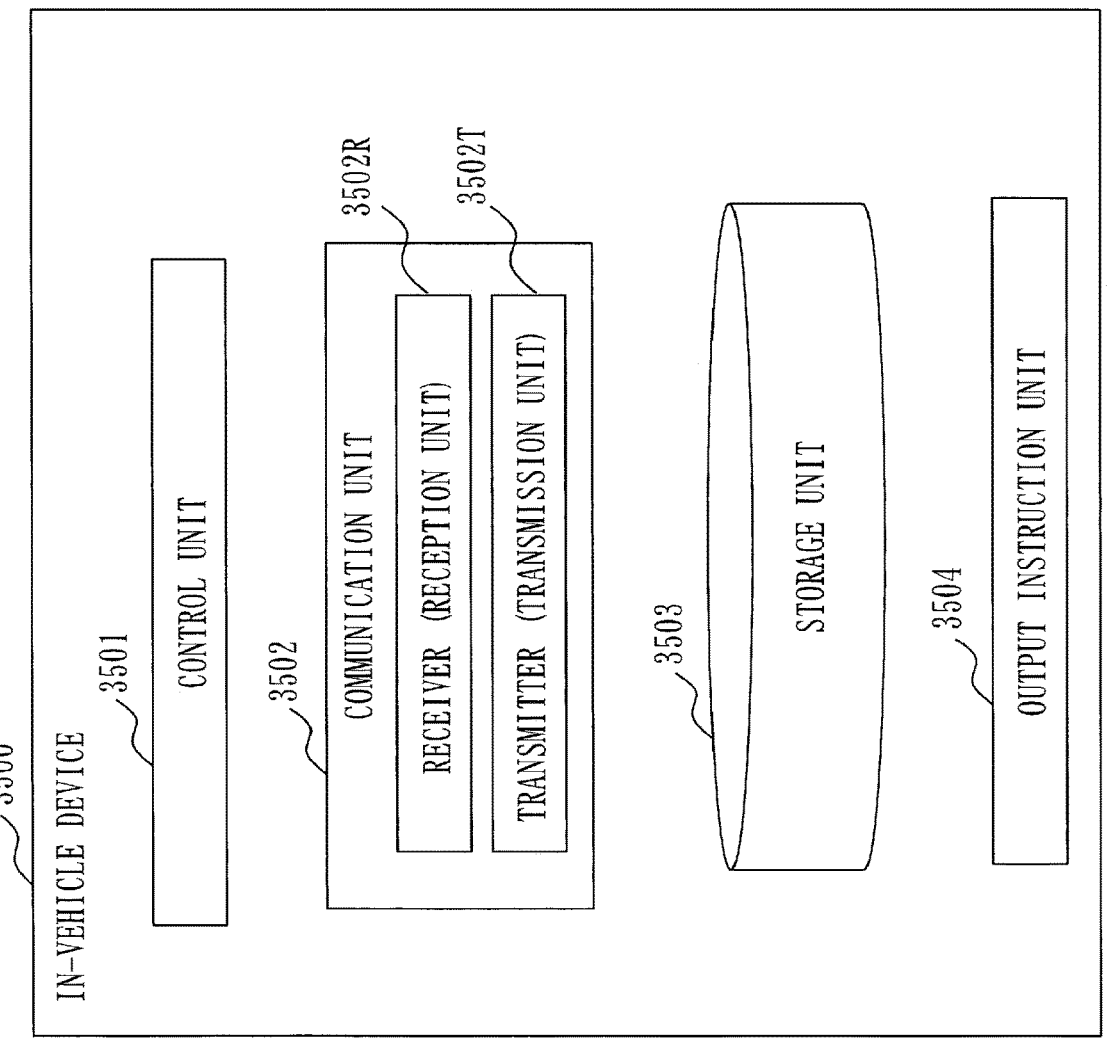
FIG. 9 is a diagram of the first embodiment, which is a block diagram of an in-vehicle device 3500.

FIG. 9 is a block diagram of the in-vehicle device 3500. The in-vehicle device 3500 includes a control unit 3501, a communication unit 3502, a storage unit 3503, and an output instruction unit 3504. The communication unit 3502 includes a receiver 3502R (reception unit) to receive signals from the devices installed in the vehicle 3000 such as the autonomous driving control device 3300 and signals from devices outside of the vehicle 3000, and also includes a transmitter 3502T (transmission unit) to transmit signals to devices inside and outside of the vehicle 3000. The output instruction unit 3504 (or the transmission unit) transmits an output instruction to an output device (not illustrated) such as a speaker to generate sound, a display deice to display a color or an image, or a light emitting device to emit light according to the control of the control unit 3501. For an external display function, a screen of a navigation device installed in the vehicle, an audio speaker, or the like may be used.

Operation for display on a display device is as follows. The in-vehicle device 3500 makes the display device (the autonomous driving display device 3900, or the like), which is installed in the vehicle 3000 and display state of which is recognizable from outside the vehicle 3000, display either the autonomous driving state or the non-autonomous driving state not being the autonomous driving state.

In this case, a driving state signal 99 indicating the driving state is received from the autonomous driving control device 3300 of the vehicle 3000, and the control unit 3501 transmits a display instruction associated with the driving state signal 99 received by the receiver 3502R to the display device via the transmitter 3502T. Alternatively, the receiver 3502R may receive a switching instruction signal 94 for instruction of switching to either of the autonomous driving and the non-autonomous driving not being the autonomous driving. The control unit 3501 transmits a display instruction associated with the switching instruction signal 94 received by the receiver 3502R to the display device via the transmitter 3502T.

The switching instruction signal 94 is generated by the control unit 101 of the monitoring device 100 and transmitted via the information gathering device 300.

The receiver 3502R receives a determination signal 90 allowing determination on which of the autonomous driving state and the non-autonomous driving state to display on the display device. In the first to third embodiments, the determination signal 90 is a driving state signal 99, a switching instruction signal 94, or the like. The control unit 3501 transmits a display instruction according to the determination signal 90 received by the receiver 3502R to the display device via the transmitter 3502T. The display device displays either of the autonomous driving state and the non-autonomous driving state according to the display instruction. The display device displays the autonomous driving when the display instruction indicates display of the autonomous driving, or displays the non-autonomous driving when the display instruction indicates display of the non-autonomous driving. Note that a display instruction is a signal instructing the display device to display the autonomous driving or the non-autonomous driving.

The control units of the monitoring device 100, the road management device 200 to the distribution device 220, the information gathering device 300, the providing device 400, the calculation device 410, and the relay device 430 are processors to carry out main operations of the respective devices. The camera unit of each of the monitoring cameras 230 is a camera also having the functions of a processor. The radar unit of each of the radars 420 is a radar also having the functions of a processor.

In addition, the communication units of the monitoring device 100 and other devices each have communication functions for communication with other devices. In addition, the storage units of the monitoring device 100 and other devices each have storage functions for storing information.

*Description of Operation*

In the assistance system 1000, the road management device 200 gathers information on vehicles moving on the managed road, irrespective of vehicles 2000 and vehicles 3000. The information gathering device 300 targets vehicles 3000 and gathers information on vehicles 3000 moving on the managed road. The monitoring device 100 then acquires each piece of information gathered by the road management device 200 and the information gathering device 300 from the road management device 200 and the information gathering device 300, and assists and monitors the vehicles 3000. The providing device 400 is a device to provide information at a merging point into the managed road, which is a main road of the expressway, to the vehicles 3000, and is an optional device of the assistance system 1000.

Hereinafter, operations for gathering information on vehicles performed by the road management device 200 will first be described with reference to a sequence diagram of FIG. 10.

Figure 10:
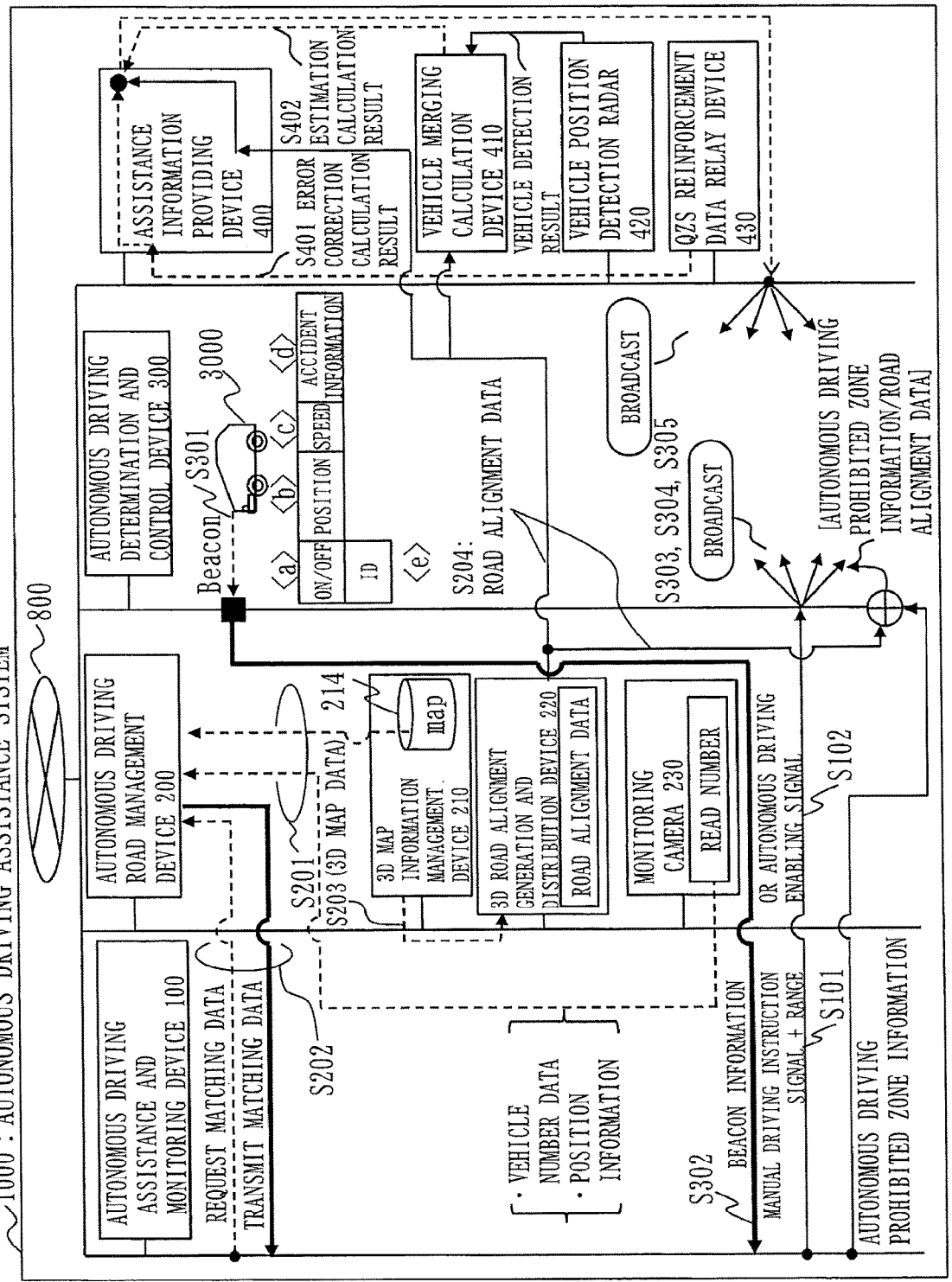
FIG. 10 is a diagram of the first embodiment, which is a sequence diagram illustrating operations of the autonomous driving assistance system 1000.

FIG. 10 is a sequence diagram illustrating operations of the assistance system 1000.

<1> As illustrated in FIG. 10, in S201, the control unit 201 generates matching data by matching vehicle number data acquired by the monitoring cameras 230 with the 3D map data 214 of the map management device 210, time, position information, and vehicle type information, to manage the vehicles moving on a road. The matching data are location information indicating locations of the vehicles moving on the managed road to be managed. The matching data are stored in the storage unit 203. Note that the matching data refer to information on moving states indicating the states in which the vehicles move on the managed road, which are information capable of identifying what types of vehicles move on what parts of the managed road and how the vehicles move. The aforementioned time is the time when a monitoring camera 230 captured a vehicle number, and is added to vehicle number data. The position information is transmitted together with the vehicle number data from the monitoring cameras 230. The vehicle type information can be acquired by the control unit 201 through search in a not-illustrated database using the acquired vehicle number data.

<2> In S202, the control unit 201 transmits the matching data to the monitoring device 100 via the communication unit 202 in response to a request from the monitoring device 100.

Next, operations of the map management device 210 will be described.

<1> The map management device 210 manages and stores 3D map data of expressways managed by a road operating company, and maintains and manages conditions under which autonomous vehicles can move safely.

<2> The 3D map data of expressways are obtained by survey by mobile mapping system (MIMS) surveying vehicles once a year or when accessories or road works occur on a road, so that latest 3D map data are managed.

<3> In S203, the control unit 211 of the map management device 210 transmits the 3D map data to the distribution device 220 so that the distribution device 220 can generate 3D road alignment data. In S204, the control unit 221 of the distribution device 220 transmits the 3D road alignment data to the providing device 400 via the communication unit 222. The 3D road alignment data are distributed to the vehicles 3000 via the providing device 400.

<4> Note that, in a case where a request for transmitting the 3D map data specifying a device is issued by the monitoring device 100, the control unit 211 transmits the 3D map data to the specified device via the communication unit 212.

Next, operations of the distribution device 220 will be described.

<1> As described in S203, the control unit 221 of the distribution device 220 generates the 3D road alignment data on the basis of the 3D map data of the expressways transmitted from the map management device 210.

<2> As described in S204, the control unit 221 transmits the generated 3D road alignment data to the providing device 400.

<3> One data amount of the 3D road alignment data is defined as the distance between three interchanges, which is between a first entrance antenna and a first exit antenna of ETC lanes (ETC is a registered trademark) of the interchanges, for each lane, and includes diverging and merging.

Figure 11:
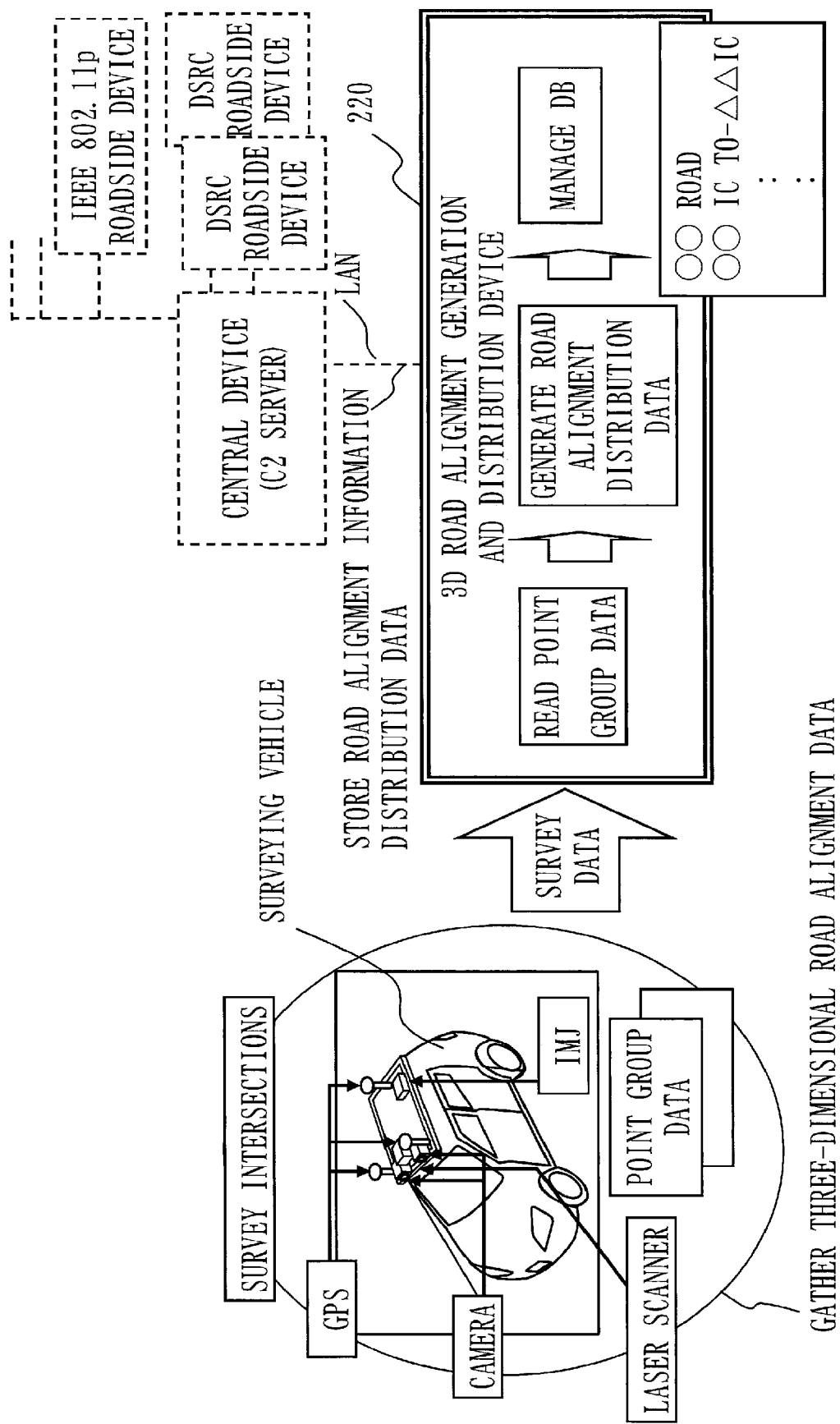
FIG. 11 is a diagram of the first embodiment, which is a diagram illustrating methods of gathering three-dimensional road alignment data and generating road alignment distribution data.

FIG. 11 is a diagram illustrating methods of gathering three-dimensional map information and generating road alignment distribution data. As illustrated in FIG. 11, three-dimensional map information is gathered by survey by MIMS surveying vehicles. The surveying vehicles include GPS receivers, cameras, laser scanners, and the like, and use these devices to gather three-dimensional map information. In the distribution device 220, the control unit 221 reads laser point group data of the three-dimensional map information, which are survey data, and generates the road alignment distribution data. The generated road alignment distribution data are managed as a database by the control unit 221.

Figure 12:
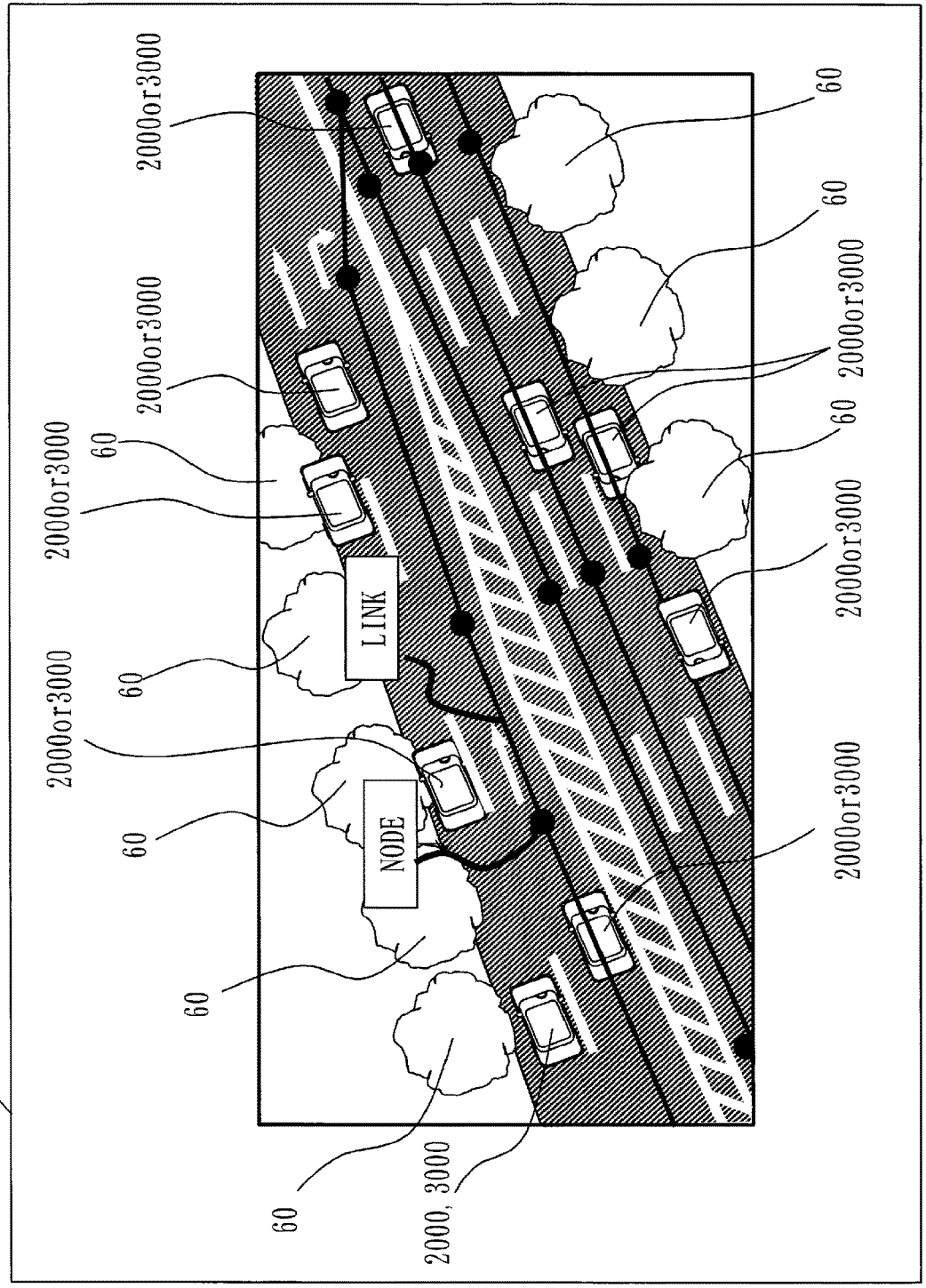
FIG. 12 is a diagram of the first embodiment, which is a diagram for explaining three-dimensional road alignment data gathered by surveying vehicles.

FIG. 12 is a diagram explaining the three-dimensional map information gathered by surveying vehicles. In FIG. 12, nodes and links are superimposed on an aerial photograph 80. Trees 60, vehicles 2000 or 3000, and a road appear in FIG. 12.

The three-dimensional map information is data constituted by nodes and links connecting the nodes. A node has three-dimensional coordinate values. Although the nodes and links are illustrated in the middle of lanes in FIG. 12, white lines on a road or guardrails on road shoulders may be used to generate data constituted by nodes and links.

Next, operations of the monitoring cameras 230 will be described.

<1> Each of the monitoring cameras 230 monitors behaviors of vehicles 2000 and 3000 moving on the managed road.

<2> The monitoring camera 230 includes the camera unit 231 to read vehicle numbers of the moving vehicles 2000 and 3000, the communication unit 232 to transmit each of the read vehicle numbers together with the time when the vehicle number was read as vehicle number data to the road management device 200, and the storage unit 233. As mentioned in S201, the camera unit 231 contains position information on the position where each of the vehicle numbers was read into the transmitted data.

<3> If the vehicle numbers and the position information cannot be transmitted to the road management device 200, the camera unit 231 holds about 200 vehicle number data in the storage unit 233 (the saved data are overwritten by latest data; the number of saved data is determined by a physical storage capacity and is thus not fixed to 200), and transmits the saved data when data transmission is enabled.

Next, operations of the information gathering device 300 will be described with reference to FIG. 10.

<1> In S301, the information gathering device 300 receives, from a vehicle 3000 moving on the managed road, a beacon signal 91B transmitted from the transmitter of the in-vehicle device 3500 and containing information whether the vehicle 3000 is an inactive vehicle 3010 in the autonomous driving inactive state or an active vehicle 3011 in the autonomous driving active state. As illustrated in FIG. 10, the beacon signal 91B contains <a> driving mode information indicating whether the driving mode is the autonomous driving active mode or the autonomous driving inactive mode, <b> information on the current position of the vehicle (latitude, longitude, altitude, and the like), <c> vehicle speed information of the vehicle, <d> an accident occurrence presence/absence signal indicating whether an accident has occurred to the vehicle, and <e> vehicle identification information identifying the vehicle. The control unit 301 of the information gathering device 300 receives the beacon signal 91B via the communication unit 302. The beacon signal 91B from the vehicle 3000 is in a data format defined by "802.11p, ITS FORUM RC-005, ARIB STD-T75, ARIB STD-T109."

Since the beacon signal 91B is encrypted through provision of security, the control unit 301 of the information gathering device 300 has a decrypting function. The control unit 301 also has a function of encrypting data to be transmitted.

<2> In S302, the control unit 301 encrypts the information of the received beacon signal 91B and transmits the encrypted information to the monitoring device 100.

<3> In S303, if a "manual signal 92A" is received from the monitoring device 100 via the communication unit 302, the control unit 301 broadcasts the "manual signal 92A" through the communication unit 302.

<4> In S304, if "autonomous driving prohibited zone information" transmitted together with the "manual signal 92A" is received, the control unit 301 broadcasts "autonomous driving prohibited zone information/road alignment data" with which the road alignment data generated by the distribution device 220 is associated. The "autonomous driving prohibited zone information/road alignment data" refers to road alignment data indicating a zone where autonomous driving is prohibited as the name suggests. The road alignment data is received by the control unit 301 from the distribution device 220 via the communication unit 302.

<5> Note that broadcasting is conducted in the data format defined by "802.11p, ITS FORUM RC-005, ARIB STD-T75, ARIB STD-T109." Transmission from the control unit 301 via the communication unit 302 is encrypted transmission provided with security.

<6> If the monitoring device 100 determines that autonomous driving has become enabled after transmission of the "manual signal 92A," the monitoring device 100 transmits an "autonomous driving enabling signal 92B" permitting autonomous driving to the information gathering device 300. In this process, if the communication unit 302 has received the "autonomous driving enabling signal 92B," the control unit 301 relays the "autonomous driving enabling signal 92B" by broadcasting in S305.

Next, operations of the providing device 400 will be described with reference to FIG. 10. The providing device 400 transmits an output result of the calculation device 410 as assistance information for accident prevention to vehicles moving on the managed road, which is a main road. Note that the providing device 400 provides the road alignment data (data of nodes and links) of the managed road to the vehicles 3000. The vehicles 3000 can thus know under what conditions the road on which the vehicles 3000 are moving is.

Operations of the providing device 400 will be described with reference to FIG. 10.

<1> In S401, the control unit 401 of the providing device 400 receives an error correction calculation result calculated by the relay device 430 via the communication unit 402 and transmits the error correction calculation result via the communication unit 402 by broadcasting. The error correction calculation result refers to correction information for positioning, and can be used by the vehicles 3000 or 2000. The error correction calculation result is transmitted at one-second intervals. In this case, the communication unit 402 broadcasts in the data format defined by "802.11p, ITS FORUM RC-005, ARIB STD-T75, ARIB STD-T109." The data to be transmitted are encrypted by the control unit 401.

<2> In addition, in S402, the control unit 401 transmits an estimation calculation result, which will be described later and which is output information of the calculation device 410 via the communication unit 402 by broadcasting. The communication unit 402 transmits the error correction data in S401 and the estimation calculation result in S402 alternately at one-second intervals.

Next, operations of the calculation device 410 will be described with reference to FIG. 10.

The estimation calculation result in S402 is calculated by the calculation device 410.

The estimation calculation result is obtained to prevent an accident of a vehicle merging into the managed road, which is a main road, from a road merging with the managed road and the vehicle 3000 moving on the managed road.

The calculation device 410 calculates the position and the time where and when the vehicle merges into a main road lane as the estimation calculation result from output results of the radars 420 that detects the positions and the speeds of vehicles (including motorcycles) moving on the merging road and the stored road alignment data.

Specific operations of the calculation device 410 will be described below.

<1> The control unit 411 calculates "vehicle information," which will be described later, and the "estimation calculation result" on a vehicle entering the main road of the expressway, which is the managed road.

<2> The control unit 411 associates the vehicle speeds and the vehicle positions detected by the radars 420 and "vehicle shapes" detected by the radars 420 with "vehicle type information (standard-sized vehicle, large-sized vehicle, extra-large vehicle, motorcycle, and the like) held by the storage unit 423." Through this association, "vehicle information" indicating what types of vehicles are currently moving at which positions, in which directions, and at what speeds is calculated.

<3> The control unit 411 estimates the merging point on the main road and the merging time of the vehicle that is going to merge into the main road from the "vehicle information" obtained as described above and the 3D road alignment data distributed from the distribution device 220.

<4> The control unit 411 transmits the estimation calculation result to the providing device 400 as mentioned in S402.

<5> The control unit 411 calculates the estimation result of merging at one-second intervals on the basis of detection results from the radars 420 calculated and updated at one-second intervals and input, and transmits the estimation calculation result to the providing device 400 via the communication unit 422 in S402 described above. The providing device 400 broadcasts each time an estimation calculation result is received as described above.

Next, the radars 420 will be described with reference to FIG. 10.

<1> A radar 420 detects a vehicle entering the main road of the expressway.

<2> The radar unit 421 of the radar 420 calculates and detects the "vehicle speed," the "vehicle position," and the "vehicle shape."

<3> As described in the description of S402, the communication unit 422 transmits a vehicle detection result from the radar unit 421 as an output result to the calculation device 410.

<4> The specifications of the radars 420 such as a 79 GHz band and a 9 GHz band are in a trade-off relationship.

<5> A vehicle detection result is transmitted to the calculation device 410 as a result updated every one second by the communication unit 422.

Figure 13:
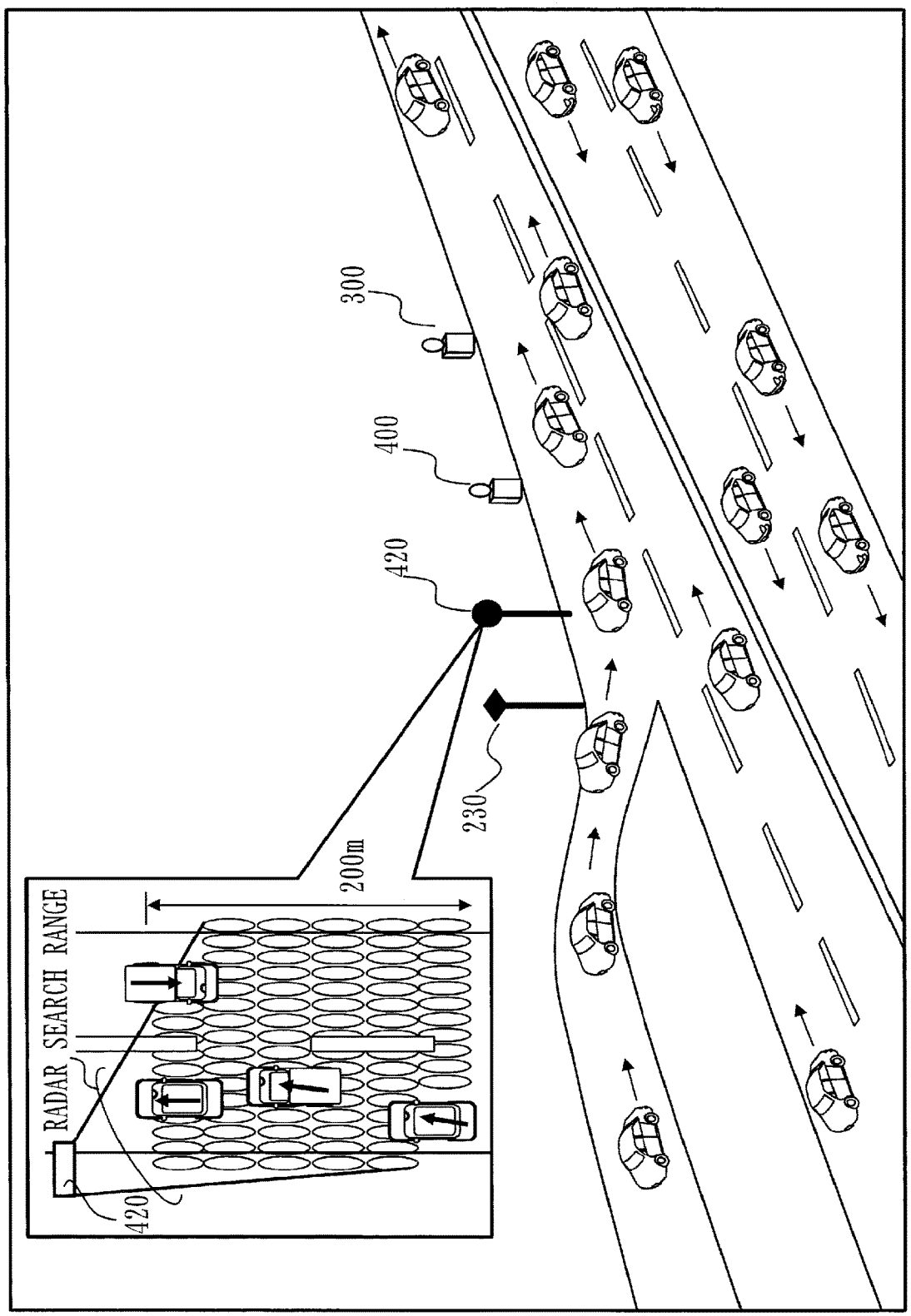
FIG. 13 is a diagram of the first embodiment, which is a diagram illustrating functions of a vehicle position detection radar 420.

FIG. 13 is a diagram illustrating the functions of the radar 420. FIG. 13 illustrates that the radar 420 is capable of detecting vehicles within a range of about 10 m in an horizontal size corresponding to two lanes and about 200 m in a vertical size in a radar emission direction, for example.

Next, the relay device 430 will be described with reference to FIG. 10.

<1> The relay device 430 is added as an optional device to the providing device 400, and receives reinforcement data from quasi-zenith satellites QZS. The reinforcement data refers to information that is original data of correction information used for positioning calculation.

<2> The control unit 431 of the relay device 430 compares the received reinforcement data with absolute coordinates of the providing device 400 held in the storage unit 433, carries out error correction calculation on the position information distributed from the quasi-zenith satellites QZS to obtain the error correction calculation result.

<3> The control unit 431 transmits the error correction calculation result from the communication unit 432 to the providing device 400.

<4> The providing device 400 broadcasts the error correction calculation result in the data format defined by "802.11p, ITS FORUM RC-005, ARIB STD-T75, ARIB STD-T109." The error correction calculation result is information used for positioning calculation of the vehicle 2000 or the vehicle 3000, allowing the vehicle 2000 or the vehicle 3000 to carry out positioning with high accuracy.

Next, operations of the monitoring device 100 will be described with reference to FIG. 10. The monitoring device 100 detects the moving states of vehicles and an accident or congestion on the managed road by receiving the matching data in S202 and receiving the beacon information in S302. The monitoring device 100 is capable of obtaining the moving states of all the vehicles on the managed road from the matching data. In addition, the control unit 101 of the monitoring device 100 is capable of obtaining the moving states of vehicles 3000 among all the vehicles moving on the managed road from the beacon information. In addition, the control unit 101 is capable of obtaining the positions on the managed road and the speeds of inactive vehicles 3010 and active vehicles 3011 from the beacon information.

The control unit 101 receives the matching data and the beacon information by the communication unit 102, and determines whether or not an accident or congestion has occurred on the managed road from such information. If it is determined that an accident or congestion has occurred, the control unit 101 transmits a manual signal 92A from the communication unit 102 to the information gathering device 300 in S101. When the information gathering device 300 has received the manual signal 92A, the control unit 301 broadcasts the manual signal 92A via the communication unit 302.

The monitoring device 100 has the functions of the following <1> to <7>.

<1> The control unit 101 monitors whether or not the managed road is in a state where the autonomous driving is enabled. The monitoring is performed using the matching data and the beacon information as described above.

<2> The control unit 101 uses the matching data and the beacon information to monitor how many vehicles 3000 are present at which points within the managed road and how the vehicles 3000 are moving.

<3> The control unit 101 manages a traffic flow, traffic conditions, presence or absence of an accident, presence or absence of congestion, and the like within the managed road acquired from the monitoring cameras 230 for road operation monitoring. This management is management using the matching data acquired from the road management device 200.

<4> If congestion, an accident or the like has occurred within the managed road, the control unit 101 broadcasts the manual signal 92A in view of preventing accidents to the vehicles 3000 via the information gathering device 300 as described in S101.

<5> The control unit 101 acquires highly accurate 3D map data managed by the map management device 210, extracts a manual driving range (a lane, a kilometer post, or a road alignment data area) from the 3D map data, and also specifies the manual driving range in transmission of the manual signal 92A. The manual driving range is determined by the control unit 3501 of the in-vehicle device 3500.

<6> In S102, if it is determined that an accident or congestion has been cleared, the control unit 101 broadcasts an autonomous driving enabling signal 92B via the information gathering device 300 similarly to the manual signal 92A.

<7> Note that the control unit 101 performs encrypted data transmission and reception to/from other devices via the communication unit 102. The control unit 101 manages authenticated key information to be used for encryption and decryption processes. The authenticated key information is stored in the storage unit 103. Note that the "manual signal 92A" in S101 and the "autonomous driving enabling signal 92B" in S102 serve as virtual traffic lights indicating whether or not the autonomous driving is permitted. In other words, the "manual signal 92A" in S101 and the "autonomous driving enabling signal 92B" in S102 serve as traffic lights for a CPU of the in-vehicle device 3500 in place of traffic lights on an ordinary road. Note that, in a case of an accident or congestion, the "manual signal 92A" may be continuously transmitted, and when the accident or the congestion has been cleared, the transmission of the "manual signal 92A" may be halted and the transmission halt of the "manual signal 92A" may be replaced by the "autonomous driving enabling signal 92B." Consequently, as a result of providing information limiting the area in which autonomous driving is enabled to the vehicles 3000 instead of prohibiting autonomous driving over the entire managed road, an effect of providing comfortable driving using autonomous driving to drivers who are road users is produced.

In the in-vehicle device 3500 of the vehicle 3000, the communication unit 3502 receives the manual signal 92A, the autonomous driving enabling signal 92B, or the like. When the manual signal 92A is received during autonomous driving, the in-vehicle device 3500 notifies the driver that switching from the autonomous driving mode to the manual driving mode is necessary. This notification is conducted by emitting a loud sound or light or generating vibration through the output instruction unit 3504 by the control unit 3501. When a manual operation to switch to manual driving is received, or a manual switching operation is delayed, the control unit 3501 automatically switches the driving mode to the manual driving mode, and decelerates by controlling the autonomous driving control device 3300. These processes prevent accidents of active vehicles 3011.

The vehicle 3000 has the functions of notifying whether or not the vehicle 3000 is under autonomous driving to its around. The functions include containing either of information informing of the "autonomous driving active mode" and information informing of the "autonomous driving inactive mode" in the beacon signal 91B and then transmitting the resulting beacon signal 91B. The vehicle device 3000 receives a "manual signal 92A," an "autonomous driving prohibited zone information" and an "autonomous driving enabling signal 92B" transmitted from the information gathering device 300, which is infrastructure equipment.

The monitoring device 100 acquires beacon information from the information gathering device 300 and compares the beacon information with matching data acquired from the road management device 200, so as to determine whether a vehicle moving on the managed road is <1> a vehicle currently carrying out autonomous driving, <2> a vehicle capable of driving under autonomous driving but being currently driven by a driver, <3> a vehicle unable to carry out autonomous driving, or the like.

A road administrator is therefore capable of knowing the behaviors of the vehicles 3000. Thus, when an accident or congestion occurs on the managed road, accidents due to autonomous driving of the vehicles 3000 are prevented by transmitting the manual signal 92A to the vehicles 3000.

Furthermore, since the vehicle identification information is contained in the beacon signal 91B, acquisition of the beacon information again after the manual signal 92A is transmitted allows vehicles that do not follow the manual signal 92A to be identified.

Second Embodiment

Whether a vehicle 3000 is moving in the autonomous driving active mode or in the autonomous driving inactive mode in which a driver drives the vehicle 3000 is not known to drivers of other vehicles moving around the vehicle 3000. Thus, while a vehicle drives following the movement of an active vehicle 3011, the driving of the active vehicle 3011 may suddenly be switched to manual driving performed by a human, and an operation of heavy braking or abrupt steering, if any, may cause an accident such as a collision, a scrape with another vehicle, or the like. The vehicle 3000 therefore includes an autonomous driving display device 3900 to inform those around the vehicle 3000 whether the vehicle 3000 is the inactive vehicle 3010 or the active vehicle 3011.

Figure 14:
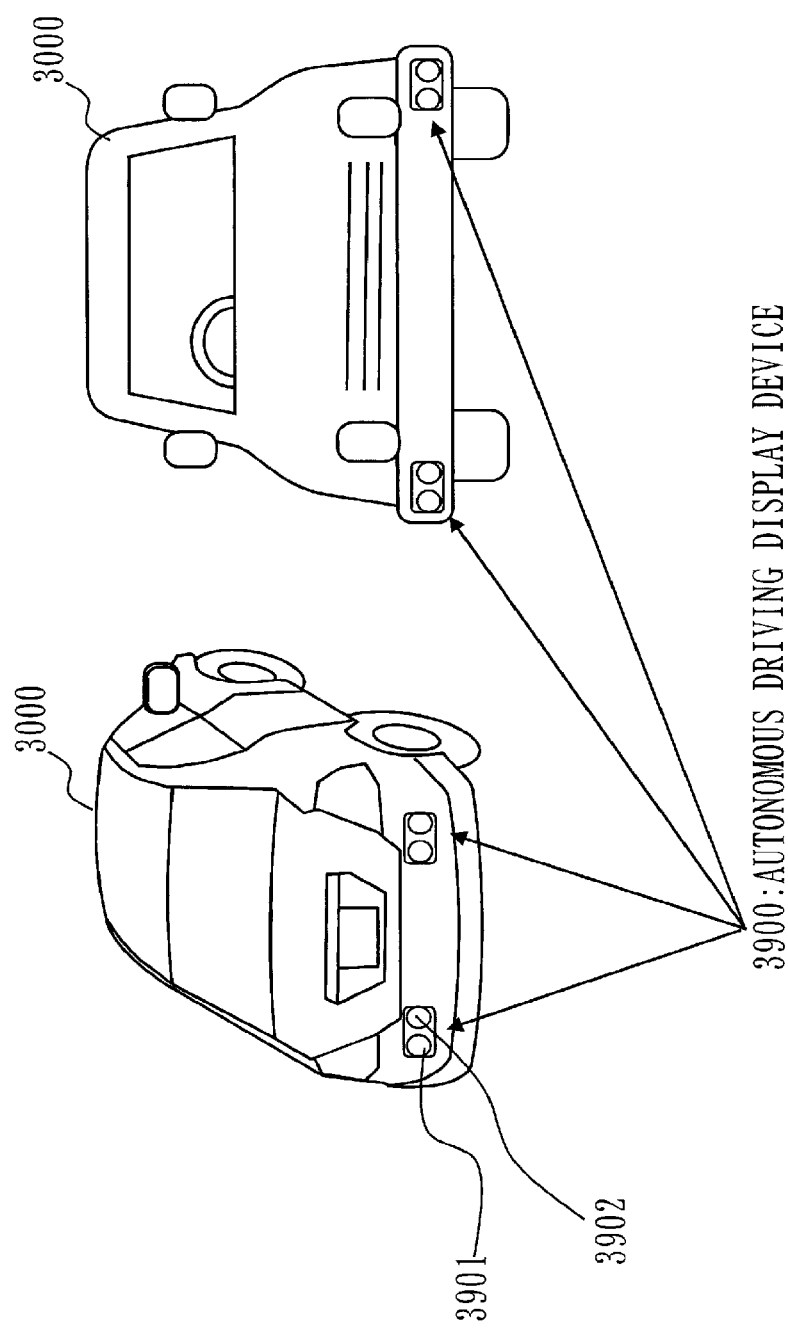
FIG. 14 is a diagram of a second embodiment, which is a diagram illustrating an autonomous driving display device 3900.

FIG. 14 illustrates the autonomous driving display device 3900. The autonomous driving display device 3900 informs the state of the vehicle to the outside in such a manner that a red brake lamp is lit when the driver has applied the brake, an autonomous driving lamp (blue or green, for example) is lit or blinks in the autonomous driving active mode, and the autonomous driving lamp is turned off in the autonomous driving inactive mode.

Thus, with the autonomous driving display device 3900, even when the following vehicle does not include an in-vehicle device 3500 such as an inter-vehicle communication device or a road-to-vehicle communication device, the driver of the following vehicle can be informed of the state of the vehicle moving ahead of the following vehicle, which prevents or reduces traffic accidents with an autonomous vehicle and a vehicle other than the autonomous vehicles. Since vehicles and the drivers of the vehicles around the autonomous vehicle can recognize that the autonomous vehicle is driving under autonomous driving, the drivers of the vehicles around are less likely to be surprised at a change in behavior due to switching between autonomous driving and non-autonomous driving.

An autonomous driving display system 3999 will be described with reference to FIG. 8. As illustrated in FIG. 8, the autonomous driving display system 3999 includes an autonomous driving control device 3300, an autonomous driving display device 3900, and an in-vehicle device 3500 within a vehicle 3000. The autonomous driving control device 3300 is installed in the vehicle 3000 and carries out autonomous driving of the vehicle 3000. The autonomous driving display device 3900 is installed in the vehicle 3000, and the display state of which is recognizable from outside the vehicle 3000. The in-vehicle device 3500 is installed in the vehicle 3000. When an autonomous driving instruction signal 93 indicating autonomous driving is received in S01, the control unit 3501 of the in-vehicle device 3500 makes the autonomous driving control device 3300 carry out autonomous driving of the vehicle 3000 in S02. The control unit 3501 also monitors start of autonomous driving of the vehicle 3000 performed by the autonomous driving control device 3300 in S03. When the autonomous driving of the vehicle 3000 is started by the autonomous driving control device 3300, the control unit 3501 controls the display state of the autonomous driving display device 3900 to be a display state different from that before the autonomous driving is started in S04.

The control unit 3501 of the in-vehicle device 3500 may receive, as the autonomous driving instruction signal 93, a switching signal 96 output when a switching control unit such as a switching button, which is to be operated for switching from the non-autonomous driving that is not the autonomous driving state to the autonomous driving, is operated.

Alternatively, the control unit 3501 of the in-vehicle device 3500 may receive, as the autonomous driving instruction signal 93, a switching instruction signal 94, which is a signal transmitted from the monitoring device 100 that is another device and which is a signal for instruction of switching from the non-autonomous driving that is not the autonomous driving state to the autonomous driving.

Note that, in making the autonomous driving control device 3300 carry out autonomous driving of the vehicle 3000, the control unit 3501 of the in-vehicle device 3500 may monitor switching from the non-autonomous driving state that is not the autonomous driving state to the autonomous driving in S03, and may make the autonomous driving display device 3900 display in different display states between until the switching to the autonomous driving and after the start of the autonomous driving.

Similarly, the switching from the autonomous driving to the non-autonomous driving may be monitored, and the autonomous driving display device 3900 may be made to display in different display states between until the switching to the non-autonomous driving and after the start of the non-autonomous driving. As described above, the control unit 3501 monitors the driving state of the vehicle 3000, and makes the display device display a display state different from the display state indicating the autonomous driving state and the display state indicating the non-autonomous driving state, during switching from the non-autonomous driving state to the autonomous driving state or during switching from the autonomous driving state to the non-autonomous driving state.

In this embodiment, the monitoring by the control unit 3501 in S03 is carried out in such a manner that the control unit 3501 acquires a driving state signal 99 from the autonomous driving control device 3300 via the receiver 3502R.

The display modes of the autonomous driving display device 3900 may be as follows. Three modes, which are an autonomous driving unsupported in which autonomous driving is disabled, an autonomous driving active mode that is autonomous driving, and an autonomous driving inactive mode indicating manual driving, are displayed in a distinguishable manner. This switching of displays can be carried out on the basis of an autonomous/non-autonomous switching control signal 95 transmitted from the monitoring device 100 of the assistance system 1000 to the vehicle 3000. Note that the switching control signal 95 includes two types of signals, which are an autonomous driving enabling signal 92B to permit the vehicle 3000 to carry out autonomous driving and a signal to directly control the vehicle 3000 to carry out autonomous driving. The switching instruction signal 94 corresponds to the case of the switching control signal 95 to directly control to carry out autonomous driving. In the case of the switching instruction signal 94, the in-vehicle device 3500 switches to autonomous driving even in absence of a driver's operation to switch to the autonomous driving.

Furthermore, as in FIG. 14, autonomous driving lamps 3901 and 3902 of the autonomous driving display device 3900 are configured to display two different colors at the front lamps and the tail lamps between under autonomous driving and under non-autonomous driving. Alternatively, the autonomous driving lamps may be configured to display three different colors at the front and tail lamps between under autonomous driving, under preparation for switching to autonomous driving, and under non-autonomous driving. Note that, although the installation positions of the autonomous driving lamps 3901 and 3902 are illustrated as being on a bumper part of the vehicle in FIG. 14, the installation positions are also affected by the design of the vehicle body, and may thus be other part and are not defined. A display of a roadside device may also be made to display either under autonomous driving or under non-autonomous driving by communication between the control unit 3501 of the in-vehicle device 3500 and the roadside display.

Furthermore, the state of being under autonomous driving or under non-autonomous driving may be displayed or output as audio on/from ETC in-vehicle devices (ETC is a registered trademark), smart phones, car navigation systems, or car radios of other vehicle s. This may be achieved in such a manner that a roadside device in receipt of a signal from the control unit 3501 of the in-vehicle device 3500 relays the signal, so that devices in other vehicles can receive the signals and thus know whether or not the vehicle is under autonomous driving.

Note that the assistance system 1000 detects the display of the autonomous driving display device 3900 of an autonomously driving vehicle with the monitoring cameras 230 to know where the vehicle is moving at what speed and where the vehicle is going.

Furthermore, the switching of display of the autonomous driving display device 3900 may be switching between non-autonomous and autonomous by operation of the switching button, which is the switching control unit, as described above, and displaying the mode to the switching button is switched.

Alternatively, a switching control signal 95 corresponding to the autonomous driving enabling signal 92B is transmitted from the monitoring device 100 of an assistance system 1000 to the vehicle 3000. The in-vehicle device 3500 of the vehicle 3000 receives the switching control signal 95 by the communication unit 3502, and the control unit 3501 outputs light or audio from the output instruction unit 3504 on the basis of the switching control signal 95. The output encourages a passenger to operate the switching button.

Since the switching from autonomous to non-autonomous should be carried out when the driver is awake, the control unit 3501 of the in-vehicle device 3500 uses the output instruction unit 3504 to output light, audio, or the like to wake up the driver in switching from autonomous to non-autonomous.

In switching from non-autonomous to autonomous, the driver may be put to sleep (apply massage inducing sound sleep or output a sound inducing sound sleep).

Even when the driving of the vehicle 3000 is suddenly switched from autonomous driving to manual driving performed by a human and an operation of heavy braking or abrupt steering is performed, the autonomous driving display device 3900 of the second embodiment allows vehicles around the vehicle 3000 to recognize the vehicle 3000, which prevents occurrence of accidents such as a collision, a scrape with another vehicle, or the like.

Some embodiments of the present invention have been described above; two of the embodiments may be combined. Alternatively, one of the embodiments may be partially carried out. Alternatively, two or more of the embodiments may be partially combined. Note that the present invention is not limited to the embodiments, but various modifications may be made thereto where necessary.

Third Embodiment

Figure 15:
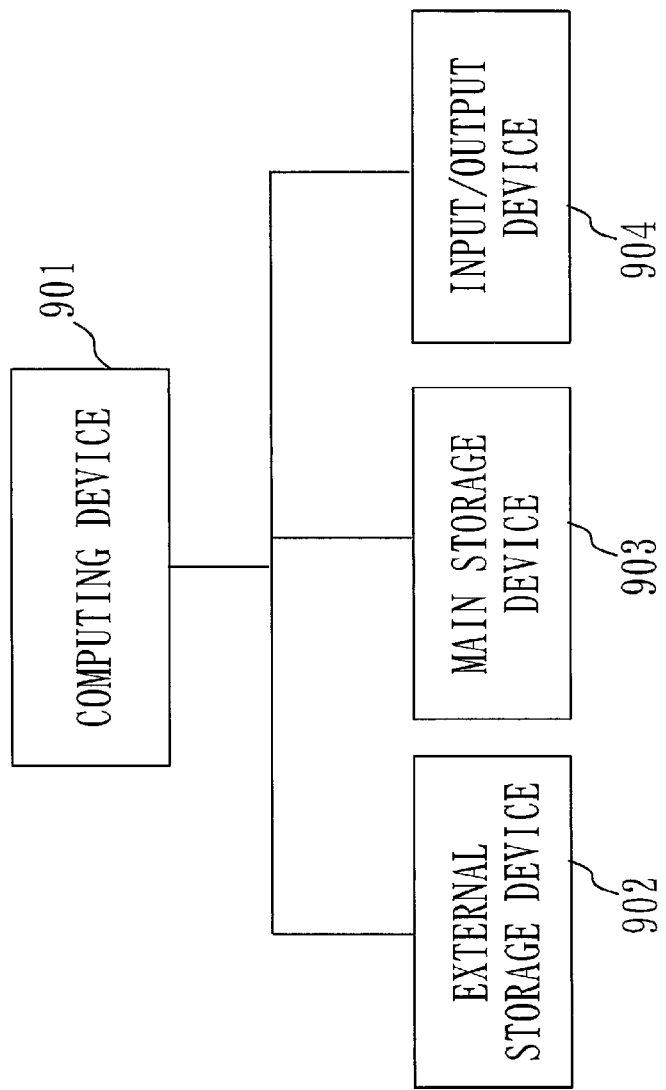
FIG. 15 is a diagram of a third embodiment, which is a diagram illustrating a hardware configuration of an autonomous driving assistance and monitoring device 100 and other devices.

FIG. 15 is a diagram illustrating an example hardware configuration of a monitoring device 100. With reference to FIG. 15, an example hardware configuration of the monitoring device 100 presented in the first embodiment.

The monitoring device 100 is a computer, and respective components of the monitoring device 100 can be implemented by programs. In the hardware configuration of the monitoring device 100, a computing device 901, an external storage device 902, a main storage unit 903, and an input/output device 904 are connected with a bus that is a physical interface.

Note that a road management device 200, an information gathering device 300, a providing device 400, a map management device 210, a distribution device 220, a calculation device 410, and a relay device 430 are also computers similar to the monitoring device 100, and have the same hardware configurations as the monitoring device 100. Thus, the description of the monitoring device 100 also applies to the road management device 200 and other devices.

The computing device 901 is a central processing unit (CPU) that executes programs. The external storage device 902 is a read only memory (ROM), a flash memory, or a hard disk device, for example. The main storage unit 903 is a random access memory (RAM).

Programs are usually stored in the external storage device 902, and are then loaded into the main storage unit 903, sequentially read therefrom into the computing device 901, and executed by the computing device 901. The programs are those implementing the functions described as " . . . units" illustrated in FIG. 4. Furthermore, the external storage device 902 also stores an operating system (OS); at least part of the OS is loaded into the main storage unit 903; and the computing device 901 executes the programs to implement the functions of the " . . . units" illustrated in FIG. 4 while executing the OS. In addition, in the description of the first and second embodiments, the information, data, signal values, and variable values indicating results of processes described as "generation of . . . ," "creation of . . . ," "calculation of . . . ," "obtainment of . . . ," "judgment of . . . ," "determination of . . . ," "update of . . . ," "estimation of . . . ," "extraction of . . . ," "selection of . . . ," "reception of . . . " and the like are stored in a form of files in the main storage unit 903.

The " . . . units" may alternatively be provided in a form of "circuitry." Alternatively, a "unit" may be replaced by a "circuit," a "step," a "procedure," or a "process." The "circuit" and "circuitry" are concepts not only including a CPU but also other types of processing circuits such as a logic IC, a gate array (GA), an application specific integrated circuit (ASIC), and a field-programmable gate array (FPGA).

Note that the configuration of FIG. 15 is merely one example of the hardware configuration of the monitoring device 100, and the hardware configuration of the monitoring device 100 is not limited to the configuration illustrated in FIG. 15 but may be other configurations.

In the embodiments described above, one example of the following autonomous driving display system has been described.

An autonomous driving display system including: an autonomous driving control device installed in a vehicle and configured to carry out autonomous driving of the vehicle; an autonomous driving display device which is installed in the vehicle and display state of which is recognizable from outside the vehicle; and an in-vehicle device installed in the vehicle and configured to make the autonomous driving control device carry out autonomous driving of the vehicle upon receiving an autonomous driving instruction signal indicating autonomous driving, monitors start of the autonomous driving of the vehicle by the autonomous driving control device, and controls a display state of the autonomous driving display device to be in a display state different from a display state before the autonomous driving is started when the autonomous driving of the vehicle is started by the autonomous driving control device.

In the embodiments described above, one example of the following autonomous driving display system has been described.

The autonomous driving display system in which the in-vehicle device receives, as the autonomous driving instruction signal, a switching signal output when a switching control unit, which is to be operated for switching from the non-autonomous driving not being the autonomous driving state to the autonomous driving, is operated.

In the embodiments described above, one example of the following autonomous driving display system has been described.

The autonomous driving display system in which the in-vehicle device receives, as the autonomous driving instruction signal, a switching instruction signal, which is a signal transmitted from another device and which is a signal for instruction of switching from the non-autonomous driving that is not the autonomous driving state to the autonomous driving.

In the embodiments described above, one example of the following autonomous driving display system has been described.

The autonomous driving display system in which, in making the autonomous driving control device carry out autonomous driving of the vehicle, the in-vehicle device monitors switching from the non-autonomous driving state that is not the autonomous driving state to the autonomous driving, and makes the autonomous driving display device display in different display states between until switching to the autonomous driving and after the start of the autonomous driving.

REFERENCE SIGNS LIST

80: aerial photograph, 91A: index signal, 91B: beacon signal, 92A: manual signal, 92B: autonomous driving enabling signal, 93: autonomous driving instruction signal, 94: switching instruction signal, 95: switching control signal, 96: switching signal, 99: driving state signal, 1000: autonomous driving assistance system, 800: network, 100: monitoring device, 101: control unit, 102: communication unit, 103: storage unit, 200: road management device, 201: control unit, 202: communication unit, 203: storage unit, 210: map management device, 211: control unit, 212: communication unit, 213: storage unit, 220: distribution device, 221: control unit, 222: communication unit, 223: storage unit, 230: monitoring camera, 231: camera unit, 232: communication unit, 233: storage unit, 300: information gathering device, 301: control unit, 302: communication unit, 303: storage unit, 400: providing device, 401: control unit, 402: communication unit, 403: storage unit, 410: calculation device, 411: control unit, 412: communication unit, 413: storage unit, 420: radar, 421: radar unit, 422: communication unit, 423: storage unit, 430: relay device, 431: control unit, 432: communication unit, 433: storage unit, 2000: vehicle, 3000: vehicle, 3010: inactive vehicle, 3011: active vehicle, 3300: autonomous driving control device, 3500: in-vehicle device, 3501: control unit, 3502: communication unit, 3502R: receiver, 3502T: transmitter, 3503: storage unit, 3504: output instruction unit, and 3900: autonomous driving display device

The invention claimed is:

1. An autonomous driving assistance system comprising:
   a road management device to generate location information indicating locations of vehicles on a managed road to be managed by using data detected by a monitoring camera to detect the vehicles moving on the managed road, and transmit the generated location information;
   an autonomous driving monitoring device to receive the location information, determine whether or not at least an event of either congestion or an accident has occurred on the managed road on the basis of the location information, and transmit a manual driving instruction signal instructing manual driving that is manual driving by a driver independent of autonomous driving if the event is determined to have occurred; and
   an autonomous driving information gathering device to transmit three-dimensional road alignment data indicating a zone in which autonomous driving is prohibited when the manual driving instruction signal is transmitted.

2. The autonomous driving assistance system according to claim 1, wherein
   the autonomous driving information gathering device receives an index signal containing a position of the autonomous driving enabled vehicle from an in-vehicle device installed in an autonomous driving enabled vehicle capable of carrying out autonomous driving, and transmits the position contained in the received index signal to the autonomous driving monitoring device, and
   the autonomous driving monitoring device determines whether or not the event has occurred on the basis of the received position and the location information.

3. The autonomous driving assistance system according to claim 2, wherein
   the index signal received by the autonomous driving information gathering device further contains vehicle identification information identifying the autonomous driving enabled vehicle,
   the autonomous driving information gathering device also transmits the vehicle identification information to the autonomous driving monitoring device, and
   the autonomous driving monitoring device uses the vehicle identification information to identify the autonomous driving enabled vehicle present on the managed road.

4. The autonomous driving assistance system according to claim 3, wherein
   the index signal received by the autonomous driving information gathering device further contains driving mode information indicating whether or not the autonomous driving enabled vehicle is under autonomous driving, the autonomous driving information gathering device also transmits the driving mode information to the autonomous driving monitoring device, and the autonomous driving monitoring device uses the position, the vehicle identification information, and the driving mode information to identify an autonomous driving active vehicle carrying out autonomous driving and identify an autonomous driving enabled vehicle failing to follow the manual driving instruction signal among the autonomous driving enabled vehicles present on the managed road.

5. The autonomous driving assistance system according to claim 1, wherein the autonomous driving monitoring device determines whether or not the event has been cleared on the managed road on the basis of the location information, and transmits an autonomous driving enabling signal permitting autonomous driving if the event is determined to have been cleared.

6. The autonomous driving assistance system according to claim 1, further comprising an assistance information providing device to acquire an estimation calculation result containing an estimated position of a merging vehicle merging into the managed road from a merging road merging with the managed road, and broadcasts the acquired estimation calculation result as assistance information.

7. An autonomous driving monitoring device comprising:
a communication unit to receive location information indicating locations of vehicles on a managed road to be managed, the location information being generated with use of data detected by a monitoring camera to detect the vehicles moving on the managed road; and
a control unit to determine whether or not at least an event of either congestion or an accident has occurred on the managed road on the basis of the received location information, and transmit, via the communication unit, a manual driving instruction signal instructing manual driving that is manual driving by a driver independent of autonomous driving and autonomous driving prohibited zone information indicating a zone where autonomous driving is prohibited on the managed road and being associated with three-dimensional road alignment data of the zone where autonomous driving is prohibited if the event is determined to have occurred.

8. A road management device comprising:
a control unit to generate location information indicating locations of vehicles on a managed road to be managed by using data detected by a monitoring camera to detect the vehicles moving on the managed road, the location information being used by an autonomous driving monitoring device in a determination process of determining whether or not at least an event of either congestion or an accident has occurred on the managed road, the autonomous driving monitoring device transmitting a manual driving instruction signal instruction manual driving that is manual driving by a driver independent of autonomous driving and autonomous driving prohibited zone information indicating a zone where autonomous driving is prohibited on the managed road and being associated with three-dimensional road alignment data of the zone where autonomous driving is prohibited if the event is determined to have occurred as a result of the determination process; and a communication unit to transmit the generated location information.

9. An autonomous driving information gathering device comprising:
a communication unit to receive an index signal containing a position, vehicle identification information, and driving mode information of an autonomous driving enabled vehicle capable of carrying out autonomous driving from an in-vehicle device installed in the autonomous driving enabled vehicle, the driving mode information indicating whether or not the autonomous driving enabled vehicle is carrying out autonomous driving; and
a control unit to transmit the position, the vehicle identification information, and the driving mode information contained in the received index signal via the communication unit to an autonomous driving monitoring device that determines whether or not at least an event of either congestion or an accident has occurred on a managed road to be managed on the basis of the position and location information indicating locations of vehicles moving on the managed road and transmits a manual driving instruction signal instruction manual driving that is manual driving by a driver independent of autonomous driving if the event is determined to have occurred.

10. An autonomous driving assistance system comprising:
a distribution device to generate a three-dimensional road alignment data based on point group data measured on a managed road;
an autonomous driving monitoring device to transmit autonomous driving prohibited zone information indicating a zone where autonomous driving is prohibited on the managed road when an event of at least one of congestion and an accident has occurred on the managed road; and
an autonomous driving information gathering device to:
receive the autonomous driving prohibited zone information,
upon receipt of the autonomous driving prohibited zone information, acquire three-dimensional road alignment data that indicates the zone where autonomous driving is prohibited, of the three-dimensional road alignment data generated by the distribution device, and
transmit the acquired three-dimensional road alignment data.

11. An autonomous driving assistance system comprising:
a distribution device to generate a three-dimensional road alignment data based on point group data measured on a managed road;
an autonomous driving monitoring device to transmit autonomous driving prohibited zone information indicating a zone where autonomous driving is prohibited on the managed road when an event of at least one of congestion and an accident has occurred on the managed road, the autonomous driving prohibited zone information being associated with the three-dimensional road alignment data generated by the distribution device; and
an autonomous driving information gathering device to receive and transmit the autonomous driving prohibited zone information.

* * * * *